United States Patent
Cardone et al.

(10) Patent No.: US 8,145,520 B2
(45) Date of Patent: Mar. 27, 2012

(54) METHOD AND SYSTEM FOR VERIFYING ELECTION RESULTS

(75) Inventors: Richard J. Cardone, Austin, TX (US); Michael Austin Halcrow, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 12/184,036

(22) Filed: Jul. 31, 2008

(65) Prior Publication Data

US 2010/0025466 A1 Feb. 4, 2010

(51) Int. Cl.
*G06F 11/00* (2006.01)
(52) U.S. Cl. ............... 705/12; 235/51; 235/386
(58) Field of Classification Search ............ 434/306; 235/51, 386; 705/12
See application file for complete search history.

(56) References Cited

U.S. PATENT DOCUMENTS

| | | | |
|---|---|---|---|
| 6,769,613 B2 | 8/2004 | McDermott et al. | |
| 6,817,515 B2 | 11/2004 | Winnett | |
| 6,865,543 B2 | 3/2005 | Gibbs, Sr. | |
| 6,971,574 B1 | 12/2005 | Herskowitz | |
| 7,099,471 B2 | 8/2006 | Neff | |
| 2002/0128901 A1 | 9/2002 | Gibbs, Sr. | |
| 2002/0128902 A1 | 9/2002 | Gibbs, Sr. | |
| 2002/0138341 A1* | 9/2002 | Rodriguez et al. | 705/12 |
| 2002/0161628 A1 | 10/2002 | Lane Poor, Jr. et al. | |
| 2003/0006282 A1 | 1/2003 | Vadura et al. | |
| 2003/0173404 A1 | 9/2003 | Chung et al. | |
| 2005/0028009 A1 | 2/2005 | Neff | |
| 2005/0139666 A1 | 6/2005 | Chou | |
| 2006/0000904 A1* | 1/2006 | Vernay et al. | 235/386 |
| 2006/0237535 A1 | 10/2006 | Watson | |
| 2007/0187498 A1 | 8/2007 | Haas | |
| 2009/0179071 A1* | 7/2009 | Backert et al. | 235/51 |

FOREIGN PATENT DOCUMENTS

WO WO 03/042931 A1 5/2003

OTHER PUBLICATIONS

U.S. Appl. No. 11/854,896, filed Sep. 13, 2007, Cardone et al.
U.S. Appl. No. 11/854,859, filed Sep. 13, 2007, Cardone et al.

* cited by examiner

*Primary Examiner* — Chrystina Zelaskiewicz
(74) *Attorney, Agent, or Firm* — Yee & Associates, P.C.; William Stock

(57) ABSTRACT

Verifying ballots that are cast in an election is provided. A mutual attestation procedure is executed between a plurality of devices communicating in a voting system via a network. A number of certificates are published. Each certificate corresponds to one of the plurality of devices and contains a public key and reference election configuration data defining a reference machine execution environment state of its corresponding device. A voter authorization token is generated for each voter. Voting results are generated in response to using a given voter authorization token to cast a given ballot using a specified voting device. Current election configuration data is generated that defines a current machine execution environment state of the specified voting device when the given ballot was cast. The current election configuration data is compared with the reference configuration data to verify a valid machine execution environment state of the specified voting device.

20 Claims, 22 Drawing Sheets

METHOD AND SYSTEM FOR VERIFYING ELECTION RESULTS

BACKGROUND OF THE INVENTION

1. Field of the Invention

The invention disclosed and claimed herein is generally directed to a method and system for carrying out elections and verifying the results thereof. More particularly, the invention pertains to a method and system of the above type wherein a trusted computing platform is used to provide secure electronic voting, and to enable aspects of the election results to be verified by members of the general public. Even more particularly, the invention pertains to a method and system of the above type wherein members of the public are enabled to verify that all cast ballots are accounted for and that only valid ballots have been tallied, or else members of the public are enabled to verify that their own individual votes were received by the pertinent election authority.

2. Description of the Related Art

Although voting systems must satisfy several critical requirements, including security, accuracy, usability, reliability, and cost-effectiveness, the ultimate measure of a voting system is whether voters trust the system to deliver a fair election. An important aspect of building trust in a voting system is the ability to perform meaningful audits and recounts of elections. This ability to double-check or verify election results usually requires both system support and the appropriate administrative procedures that define how to carry out verification.

With the increasing use of electronic voting systems in public elections, the importance of verifiability can hardly be overstated. Many ATM-style, direct-recording electronic (DRE) systems in use today provide vote tallies based on computations performed in computer memory. Verification on these systems is often limited to rerunning the same computation with the same input, a process that would not detect whether the input was tampered with or whether the software performing the calculation was executing correctly. Several incidents in recent years indicate that the level of verification in DRE voting system is not adequate to allay the concerns of many about the accuracy of such systems. For example, in a U.S. House of Representatives contest in Florida in November, 2006, an 18,000 ballot undervote could not be rectified because there was no way to perform a recount without trusting the same machines suspected to be at fault to begin with.

Many people believe that some form of a paper record is needed to provide verifiability. Dozens of U.S. states have passed laws requiring paper records of voter selections so that useful audits and recounts can be performed. In addition, some systems allow voters to double-check their choices on paper media before casting their ballots. This belief that paper records will result in more trustworthy voting systems has fueled a trend towards optical-scan systems and DRE systems with voter-verified paper trails (VVPT). The former systems rely on scanning technology similar to that used in standardized tests. The latter systems add printers to DRE systems, and define the administrative and legal policies for managing the electronic and paper representations of voter ballots.

Unfortunately, paper records are no panacea for providing trustworthy electronic voting systems. Indeed, it was not long after introduction in the late 1800's of the modern paper ballot, known as the Australian ballot, that many effective schemes for subverting elections were put into practice. These schemes included ballot box stuffing, ballot destruction, and ways to tamper with ballots during vote counting so that particular ballots could be disqualified (Encyclopedia Britannica, 11th Edition, 1910, Voting Machines). In more recent times, it has been recognized that optical-scan equipment can produce inaccurate tallies (The Brennan Center for Justice, *The Machinery of Democracy: Voting System Security, Accessibility, Usability, and Cost,* 2006, p 28); that procedures for processing optical-scan ballots can lead to errors (New York Times, *Audit Find Many Faults in Cleveland's '06 Vote,* Apr. 20, 2007); that printers used in some election environments fail at a rate of nearly 10% (Associated Press, Paper Jams Hamper Electronic Voting, Dec. 21, 2006), thus making them unreliable for verification purposes; that the management, processing, storage, and expense of paper ballots can be challenging (New York Times, *Ballot Flaws and Technical Errors Have California Still Counting Heavy February 5 Vote,* Feb. 17, 2008); and that relying on voter verification to catch voting machine errors is an unproven hypothesis (Selker and Cohen, *An Active Approach to Voting Verification,* Caltech/MIT Voting Technology Project, May 2005).

Another recent approach, which is embodied in the Punchscan (http://punchscan.org) system, uses cryptographic techniques involving two-layer paper ballots, ballot receipts, and the publication of various transformation tables. These tables can be used by voters after an election to verify that their votes were counted. However, systems of this type raise issues that include the cost of the special paper ballots; the complexity of the cryptographic protocols and procedures; the difficulty in handling write-in votes; and concerns regarding accessibility.

BRIEF SUMMARY OF THE INVENTION

The invention pertains to a method and system for verifying election results, in association with an election process and a particular election. One useful embodiment of the invention is directed to a method, wherein a plurality of voters are each authorized to cast a ballot by using a specified voting device of a voting system, that comprises a number of devices, wherein the specified device may have one of a number of states, and the process is under the supervision of an Election Authority (EA). It is to be understood that a certificate associated with the specified device contains one or more public keys for the specified device, and also the Election Configuration (EC) for such device. The EC is the reference state for the specified device, that is, the state that the specified device is expected to be in during an election. Thus, when ballots are cast in the election, the actual state of the device at such time is compared to the EC of the device as part of the verification process. Accordingly, the method includes the step of publishing a number of certificates, wherein one or more public keys used in the election process are each contained in a different one of the certificates, and each certificate also contains an election configuration (EC) that specifies the expected state of one of the devices during the election.

The method further includes generating a voter authorization token (VAT) for each authorized voter, wherein each VAT enables one of the authorized voters to cast one and only one of the ballots in the particular election. A set of voting results is generated in response to the use of a given one of the VATs to cast a given ballot, wherein the set of voting results includes the given VAT, the cast given ballot, and the state of the specified voting device when the given ballot was cast. The set of voting results is also signed by a unique private key that corresponds to one of the public keys that is associated with the specified voting device. A further step of the method comprises publishing a set of items that include at least lists of all VATs and all sets of voting results that are respectively generated in connection with the particular election, wherein the published items are available, together with the published certificates, for use by members of the public to verify ballots cast in the particular election.

DETAILED DESCRIPTION OF THE INVENTION

Figure 1:
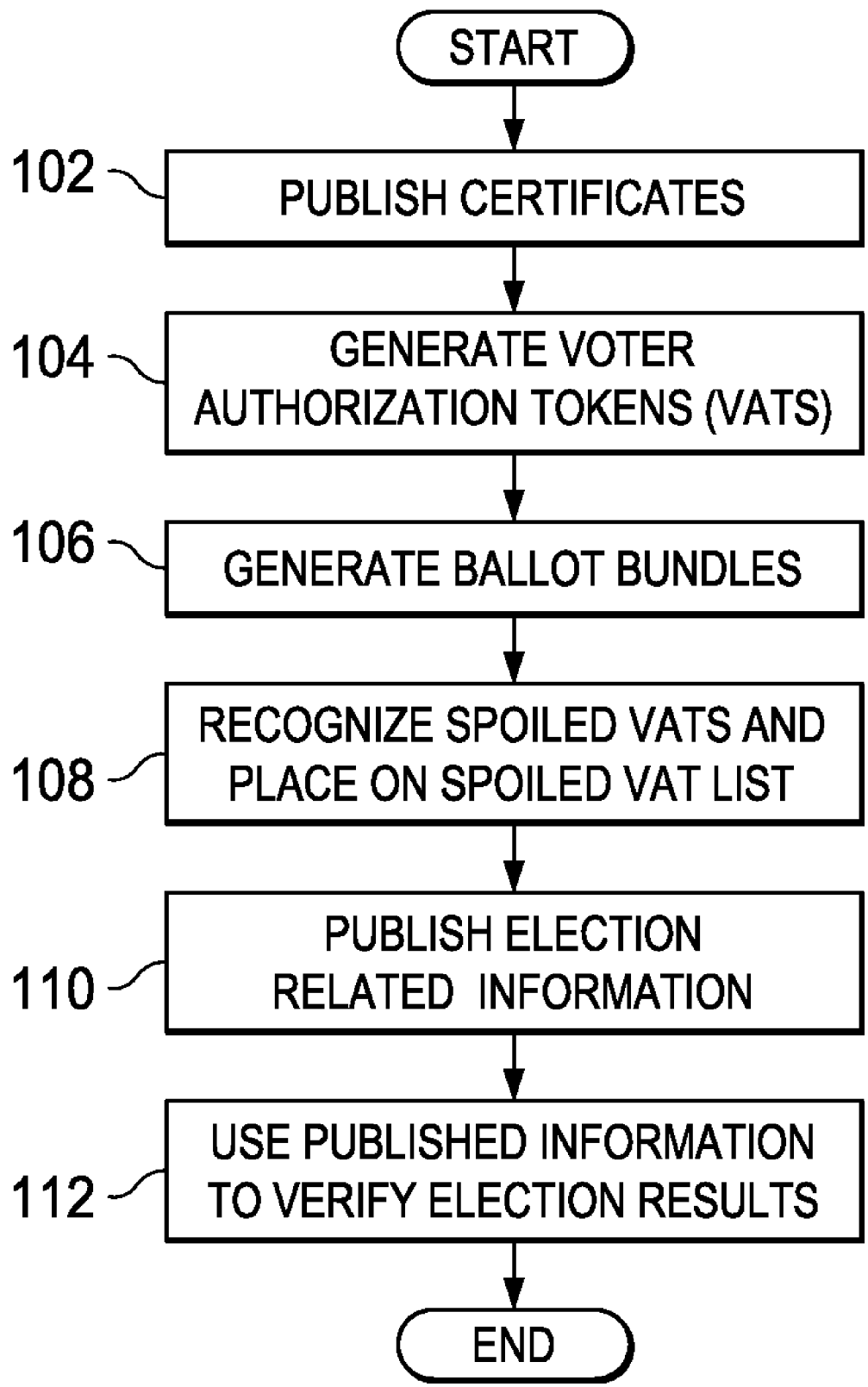
FIG. 1 is a flowchart showing selected steps for an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

To address problems with the prior art such as those discussed above, the present invention recognizes that if (1) a user knows exactly what software an electronic voting system is running, and (2) has confidence in the correctness of that software, then the user can have confidence in the voting system. Condition (1) can be achieved by properly configuring and using a cryptographically-enhanced, trusted computing platform, such as the platform defined by the Trusted Computing Group (https://www.trustedcomputinggroup.org) and referred to as a Trusted Computing Platform (TCP). Condition (2) can be achieved by using commodity hardware, open source software, and a community development process that exposes the complete platform to public scrutiny. The result is that voting systems so constructed can inspire a high level of confidence among the voting public.

It is generally desirable for public elections to exhibit the following characteristics:
1. Only authorized voters can vote.
2. No one can vote more than once.
3. No one can determine how another person voted.
4. No one can prove how they voted to another person.
5. No one can change or discard the vote of another.
6. All votes are accurately counted.

Embodiments of the present invention increase the level of confidence in an election by verifying that all valid votes are accurately counted, while preserving the other above characteristics of an election.

As used herein, the term "verify" means carrying out a task or process to ensure that a particular election has all of the above characteristics 1-6. Respective embodiments specify how election data are tied to trusted states of known devices and how those data are published. Members of the general public can use this published data to verify various aspects of the election results, including in one embodiment the vote tally in all contests. Though most voters will not have the inclination or expertise to verify all aspects of an election, those versed in the art can provide publicly available tools to automate the verification process.

In order to implement embodiments of the invention, it is very useful to provide a voting system that comprises multiple computing devices, including voting machines (VM), tally servers (TS), and voter check-in stations (VCIS), that can communicate with each other over a network. In a voting system of this type, respective computing devices have the following characteristics:
1. Each computing device that participates in the voting system runs on a Trusted Computing Platform, such as the platform defined by the Trusted Computing Group.
2. Each computing device has an election configuration (EC) that specifies the precise firmware and software that the device runs during an election contest. In an embodied form, this configuration may include Platform Configuration Register (PCR) values combined with a system log.
3. Only devices executing their election configuration can participate in the voting system.
4. Each device participating in the election can be uniquely identified.
5. Before communicating, two devices in the system mutually attest their execution state to each other. Communication only precedes if both devices can prove that they are in their respective election configurations.
6. The integrity and, where necessary, the privacy of data communicated between devices is cryptographically protected using the facilities of the Trusted Computing Platform.

Herein, references to a voting system for implementing embodiments of the invention pertain to a voting system that has all of the above characteristics. However, it is to be emphasized that such voting machines could include zero or more check-in stations, zero or more tally servers, one or more voting machines, and any number of other devices, including but not limited to, printers, smart card readers, magnetic card readers, bar code scanners, biometric readers, and communications devices. It is to be emphasized further that embodiments of the invention can be applied to any configuration of a voting system that is based on a Trusted Computing Platform, such as configurations described in the TEVS referenced hereinafter. The term "voting system", as used hereinafter in the description of various embodiments of the invention, pertains to a system that has all the above characteristics. Also, for purposes of illustration only, such system includes one voting machine, one tally server and one vote check-in station.

It is emphasized that in very useful embodiments of the invention, some or all of the computing devices each contains a hardware module such as the Trusted Platform Module (TPM) defined by the Trusted Computing Group. Each TPM comprises an integrated circuit or chip that contains a private key, wherein the private key is associated with a public key in an asymmetric encryption protocol. The public key can be made publicly available, while the private key is always securely retained in the TPM hardware module. Thus, the private key cannot be discovered or affected by a purely software-based attack that is directed at the TPM chip. Rather, the physical security of the TPM or the device in which it resides must be breached to compromise the private key. This provision significantly enhances confidence and trust in the accuracy of the results provided by respective devices of the voting system. Also, as described hereinafter in further detail, the private key of each particular computing device can be used to sign or authenticate results produced by operation of the device. By making the corresponding public key available to the public, members of the public can readily confirm or verify results of the particular device.

Use of a voting system with a Trusted Computing Platform as described above, in order to implement embodiments of the invention, provides a number of additional benefits. For example, by running on the Trusted Computing Platform, the voting system is configured to run only known firmware and software. Also, by making firmware and software open source, the public can directly verify the correctness of the voting system. Embodiments of the present invention depend on the fact that only known, trusted code executes as part of the voting system. Also, it is assumed that before two voting system devices communicate, they mutually attest that they are executing in their Election Configurations.

Voting systems for use in embodiments of the invention could usefully comprise a Trusted Electronic Voting System (TEVS) as disclosed in U.S. patent application Ser. Nos. 11/854,859 and 11/854,896 filed Sep. 13, 2007, which names Richard Cardone, Michael Halcrow, Benjamin Landman and Kent Yoder, as co-inventors and is assigned to the International Business Machines Corporation. However, the invention is not limited to the TEVS.

Referring to FIG. 1, there are shown steps 102-112, which collectively comprise the basic algorithm or method for embodiments of the invention. These steps are respectively described hereinafter, in connection with FIG. 1 and also FIGS. 4-17.

Publish Certificates (Step 102) The Trusted Computing Platform on which the voting system runs provides asymmetric keys for signing election data, by using a standard public key cipher such as the Rivest-Shamir-Adlement algorithm (RSA) or Digital Signature Algorithm (DSA). Each of a number of hardware devices has a private key (PRIVK) that is restricted for use by a specific software module on the specific hardware device. Thus, there is a one-to-one mapping between respective private keys, which are used as signing keys, and software module instances. The Public keys (PUBK) that respectively correspond to the private keys and are used to verify signatures are published on any convenient media that the public can access, such as in files that can be downloaded from a web site.

An Election Authority (EA) administrator associated with the election process publishes certificates for all public keys necessary to verify all of the signatures of published election results. These keys include $PUBK_{EA}$, the public key of the Election Authority, and the public keys $PUBK_{VM}$, $PUBK_{TS}$, $PUBK_{VG}$. These keys correspond, respectively, to VM and TS instances, and to instances of VAT generator module (VATGEN), described hereinafter. The keys can also include Attestation Identity Keys (AIKs) linked to the TPM devices in corresponding or related machines of the voting system.

In addition, a certificate contains the Election Configuration (EC) for the computing device it describes. An EC specifies a device's execution state and typically provides a measurement of the firmware and software loaded on the device. In useful embodiments, an EC includes the Platform Configuration Register (PCR) values and the system log entries of a TPM. An EC stored in a certificate is called a reference EC, because it is used to compare the current execution state of a device to the expected state, as defined in the device's certificate. Reference ECs are used during election result verification to determine whether a device was running in a trusted state when it calculated its election data. Reference ECs are also used during a mutual attestation protocol to determine if devices are in a valid state to communicate with each other.

All election data are signed using keys protected and managed by the Trusted Computing Platform, and the signed election data are always tied to proof that the originating device is executing in its EC. This proof includes system state descriptors (e.g., PCR and logs) signed by the Trusted Computing Platform. A user may infer that a device running in its EC will operate as expected, and thus may infer the integrity of any election data signed with a key managed by such a device.

In one embodiment, a device certificate may also include the EC of the EA, which is used to verify the trusted state of the EA at the time it generated the certificate. Alternatively, the signing key of the EA could be sealed to a trusted state (i.e., the EC) of the EA device. This sealing operation guarantees through the facilities of the Trusted Computing Platform that the signing key of the EA can only be accessed when the EA device is running in its EC. This guarantee implies that if the EA signs a certificate, that certificate was created under the trusted configuration of the EA. When sealing is used, a trusted auditing body would assert that the signing key of the EA is bound to a trusted device state. In general, the EA signing key is published via a trusted channel.

In a useful embodiment, the Election Authority (EA) signs and publishes the complete list of public key certificates for all VM, TS and VATGEN subsystems. This signed list of public keys provides the public with the information required to validate the EC of the machines and the votes cast on the machines.

In one embodiment, the public key of the EA is also packaged in a certificate. This certificate can be signed by a trusted third party or signed by the EA itself, and published via a trusted channel.

Generate VATs (Step 104) A VAT is a token that enables the possessor to anonymously cast a single ballot in a particular election. Characteristics of the VAT prevent it from being double-spent, while assuring that it can only be used to cast a vote in a particular place and in the particular election. Minimally, VAT={NONCE, EINFO}, where NONCE is a unique random value for the VAT, and EINFO contains election information. The election information is tailored to the needs of a particular election in a particular jurisdiction. The information can include an election identifier, a creation timestamp, a start timestamp, a time period, an expiration timestamp, a polling place designation, a ballot style identifier, a provisional voter identifier, a voter identifier, or any other data needed to administer an election.

In embodiments of the invention, a VAT is created by an instance of a VATGEN module, and the VAT is signed by such VATGEN instance. In the voting system described herein, a polling place runs a single instance of VATGEN on the hardware of a polling place check-in station. VATGEN only executes on systems that are in a trusted EC, and each VATGEN module has a key pair $PRIVK_{VG}$ and $PUBK_{VG}$ that are used to sign and verify the VATs generated by the VATGEN.

In addition, the present invention uses VATs that include proof of being generated on a machine running a particular EC. Specifically, VATGEN generates VATs that contain the following information:

$\{NONCE, EINFO, EC_{VG}, E_{PRIVK_{VG}}\{H\{NONCE, EINFO, EC_{VG}\}\}, CERT_{K_{CA}}\{PUBK_{VG}, EC_{REF-VG}\}\}$

The NONCE and EINFO are as described above for a minimal VAT. $EC_{VG}$ is a current election configuration state descriptor (such as PCRs and logs), which are generated by the Trusted Computing Platform on which the VATGEN module runs. The fourth element of the VAT is the encryption of the hash of the first three elements using the signing key of the VATGEN module, i.e., $PRIVK_{VG}$. The last element of the VAT is the certificate issued by the election authority to certify the VATGEN public key and the reference EC, $EC_{REF-VG}$. In one embodiment, the $PRIVK_{VG}$ is sealed, so that it can only be accessed when the system is in its EC.

Herein, the term "VAT" refers to a signed VAT that is tied to an election configuration, unless otherwise noted. In addition, the data contained and exposed in an EC, and how those data are hashed, can vary in different applications. The important characteristic of EC data, however, is that they relate to a specific trust state of a Trusted Computing Platform.

When entering a polling place in connection with an election, a voter goes to a check-in station to provide his or her identifying credentials. The particular requirements for authenticating a voter are determined by electoral policies of the jurisdiction responsible for the election. Once a voter has been authenticated, the check-in station uses voter registration data to determine whether the voter is authorized to vote in the election and, if so, what specific procedures the voter must follow. Once it is determined that a voter is authorized to vote at the polling place, the check-in station application sends a request to the VATGEN module to create a new VAT.

In response to the request, the VATGEN creates the new VAT, enters the newly created VAT into its Generated VAT List and sends the VAT to the check-in station application. The check-in station then proceeds to verify the signature on the VAT. In a useful embodiment, the state of the execution environment can be verified by comparing the EC in the VAT to the reference EC in the VATGEN certificate. If the signature is verified, the check-in station generates a random code and sends the code and the VAT to a tally server. A check-in station operator then gives the code to the voter, and tells the voter to enter the code as the initial input to a voting machine.

In a useful embodiment, the code consists of five random digits or characters that are currently unused, and that expire after a time period of half hour.

The tally server usefully manages VAT expiration. The tally server also maintains a VAT table in which each entry contains a code, its associated VAT, a received timestamp, and a status field. When the tally server receives a new VAT from the check-in station, the signature in the VAT is verified. In a useful embodiment, the state of the VATGEN execution environment can be verified by comparing the EC in the VAT to the reference EC in the VATGEN certificate. If the verification succeeds, the tally server creates a new table entry with the code, VAT, and timestamp fields filled in appropriately. The status field is set to unused.

Generate Ballot Bundles (Step 106) A voter accesses a voting machine by inputting the code he or she received at the check-in station. When the input code is received, the voting machine sends the code in a ballot request to the tally server. The tally server uses the code to retrieve the associated VAT. If the VAT is found, the VAT and a new ballot is sent to the voting machine. The tally server sets the status field associated with the VAT in its VAT table to in-use. Useful embodiments pre-load or cache ballots on voting machines to reduce network traffic.

If no VAT is associated with the code, the ballot request fails. The most common reasons for a request to fail is that a time period associated with the VAT has expired, or the VAT has already been used. Expired VATs are discussed hereinafter in connection with step 108.

When the voting machine ballot request succeeds, the voting machine presents the ballot to the voter. The voter uses the voting machine to make his or her selections, and when finished the voter casts the ballot.

When a ballot is cast, the voting machine concatenates into a single message the VAT, the marked ballot (B), which includes a nonce value, and the current election configuration ($EC_{VM}$) of the voting machine. The voting machine then signs the $EC_{VM}$, VAT, and marked ballot with a unique signing key, and appends such signature to the message. The unique signing key comprises a private key, as described above, that resides in a TPM chip in the voting machine and has an associated public key. A certificate for such public key of the voting machine, issued by the election authority (EA), is then appended to the message. The message is called a ballot bundle, and is sent to the tally server. The ballot bundle (BB) takes the form:

{VAT, B, $EC_{VM}$, $E_{PRIVK_{VM}}$\{H\{VAT, B, $EC_{VM}$\}\}, $CERT_{K_{EA}}$\{$PUBK_{VM}$, $EC_{REF-VM}$\}\}

The tally server receives the ballot bundle and verifies the voting machine signature. In a useful embodiment, the state of the Voting Machine execution environment can be verified by comparing the EC in the BB to the reference EC in the Voting Machine certificate. If the verification succeeds, the tally server adds the votes contained in the ballot to the cumulative tallies for each election contest. The tally server removes the entry of the received VAT from the VAT table, and saves the ballot bundle in the Ballot Bundle List. In the ballot bundle, the element \{$CERTK_{EA}$\{$PUBK_{VM}$, $EC_{REF-VM}$\} is a certificate issued by the EA to certify the voting machine public key and reference EC, that is, $EC_{REF-VM}$.

As an option, the voter may be supplied with H\{VAT, B, $EC_{VM}$\}, which the voter can later use to validate that his/her ballot is recorded in a published list of hashes. This option is used in a Hashed Ballot Embodiment, described hereinafter in further detail in connection with step 110.

Recognize and List Spoiled VATs (Step 108) In the above voting system, the tally server manages VATs after they are created and before they are associated with a cast ballot. When the tally server receives a VAT from the check-in station, the tally server puts the VAT in the VAT table, along with a timestamp of when the VAT was received. If a voting machine does not issue a ballot request for a VAT within the allowed time period following the time of the timestamp, the tally server expires the VAT. The tally server expires a VAT by removing it from its VAT table and adding the VAT to a Spoiled VAT List. When the polls close, any entries remaining in the VAT table are also moved to the Spoiled VAT list.

Publish Election Results and Other Information (Step 110) In connection with a voting system as referred to above, the Election Authority publishes election results after the polls close. In one embodiment, called the Ballot Bundle Embodiment, the Election Authority publishes ballot bundles. In an alternate embodiment, called the Hashed Ballot Embodiment, the Election Authority publishes only the hash of the ballot information. This alternate embodiment requires that voters be given the hash value H\{VAT, B, $EC_{VM}$\}. As is well known by those of skill in the art, one-way hash functions are frequently used to convert variable-length input data into a fixed-length output string such that (1) slightly different inputs yield significantly different outputs, and (2) given only an output string, it is improbable that the initial input data could be recovered.

When the polls close, the election authority publishes the following information:

1. Every Generated VAT List signed by its VATGEN module and concatenated with the PUBK certificate for that VATGEN module.
2. Every Spoiled VAT List signed by its tally server and concatenated with the PUBK certificate for that tally server.
3. In the Ballot Bundle Embodiment, every Ballot Bundle List signed by its tally server and concatenated with the PUBK certificate for that tally server.
4. In the Hashed Ballot Embodiment, a list of \{VAT, H\{VAT, B, $EC_{VM}$\}\} values extracted from every Ballot Bundle List entry, signed by its tally server, and concatenated with the PUBK certificate for that tally server.
5. The tallies for all contests in the election signed by the election authority administrator.

The above example has only one polling place with one VATGEN module and one tally server, so the publication list is short. In a useful embodiment, the above lists are published in files on a web site.

Verify Election Results (Step 112) Using the keys as described above in connection with step 102 and the lists published as described above in connection with step 110, a member of the public can do the following:

1. Check the integrity of the published keys by verifying the signature of the list using the globally trusted Election Authority key, $PUBK_{EA}$.
2. When the Election Authority EC is published, check that it matches the corresponding EC in each certificate published in step 102.
3. Check the integrity of each published list in step 110 verifying the signatures on each list, the ECs associated with each list, the signatures on each entry in each list, and the ECs used in each entry in each list.
4. Check that the number of generated VATs equals the exact sum of the number of spoiled VATs and the number of used VATs (i.e., VATs that have associated ballot information).
5. Check that every generated VAT appears exactly once among the spoiled or used VATs.
6. Check that each used VAT is associated with a properly constructed ballot bundle.

7. For the Ballot Bundle Embodiment, use the ballot bundles to calculate the results for each contest and check those results against the published tallies.

8. For the Hashed Ballot Embodiment, each voter can check that the election authority recorded the vote of such voter by using the ballot hash (H{VAT, B, $EC_{VM}$}). Voters could also check that the ballot hash values respectively given to them when they cast their ballots each appears in exactly one published list of ballot bundle hashes.

Figure 2:
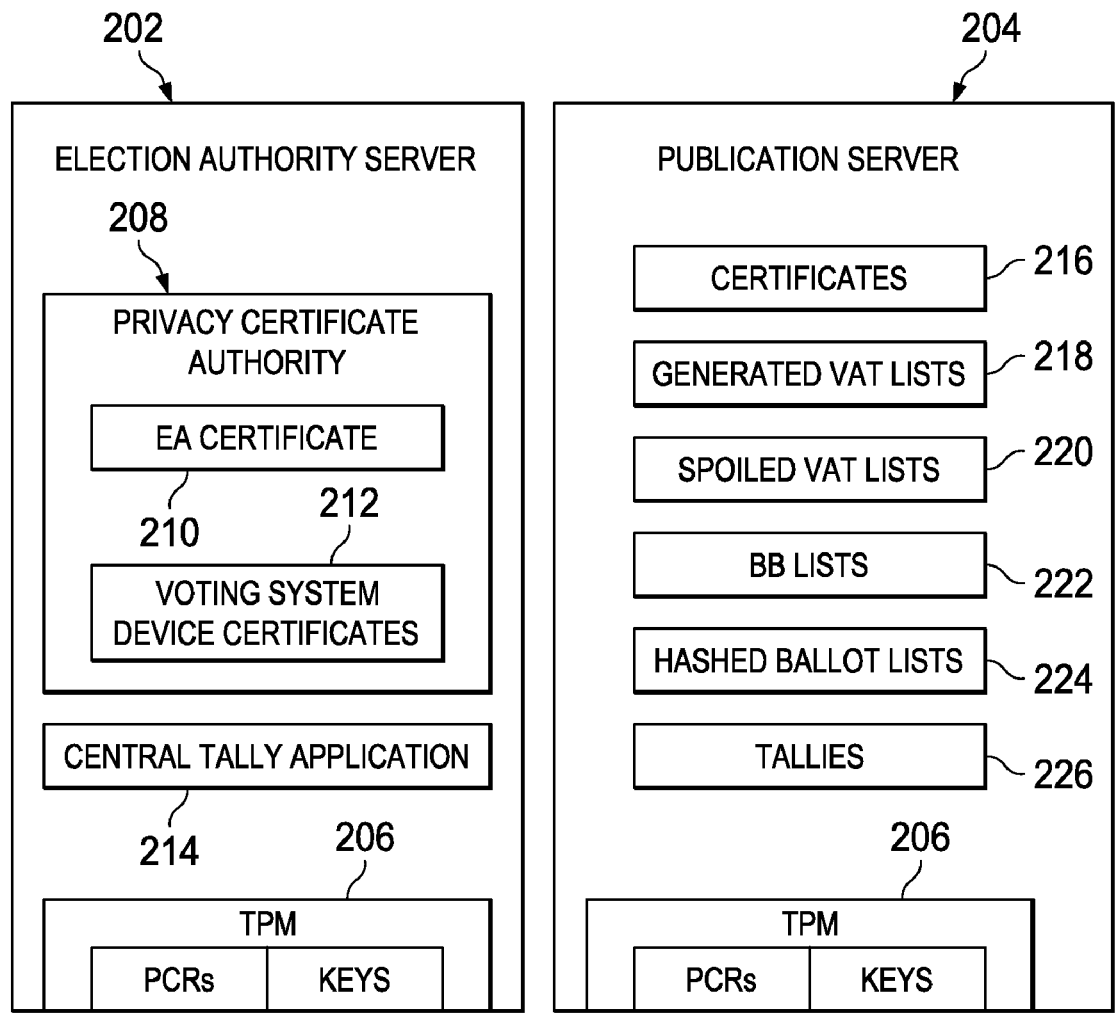
FIG. 2 is a block diagram showing components of a system that is operable to supervise and administer elections in association with an Election Authority (EA) in accordance with an embodiment of the invention.

FIG. 2 shows an Election Authority Server 202 and a Publication Server 204, both of which run in a voting system as Trusted Computing Platforms. Servers 202 and 204 may reside, for example, in a county clerk's office or the like. In a useful embodiment, each server uses a Trusted Platform Module (TPM) chip 206 to implement the facilities of a Trusted Computing Platform as defined by the Trusted Computing Group. Each device defines an Election Configuration (EC), which is the configuration that a device must be executing in order to participate in the voting system. In addition, the TPM manages a mutual attestation protocol that devices in the voting system perform before they exchange election data with each other. The protocol only allows the devices to communicate if both are in their respective ECs. In useful embodiments, the Election Authority Server and Publication Server reside in a physically secure, central location under the control of the Election Authority.

The Election Authority Server 202 executes applications used in pre-election and post-election processing. Though the Election Authority Server 202 is illustrated as a single hardware device, the applications that run on the server can be distributed over multiple devices, each of which runs as a Trusted Computing Platform. A Privacy Certificate Authority 208, also known as the Privacy CA, maintains a certificate for each component of the election system. In particular, the Privacy CA maintains an Election Authority (EA) Certificate 210, which contains a public key for use as described above to verify the signatures on all other certificates. The Privacy CA also generates and maintains the Voting System Device Certificates 212, which contain public keys used to verify signatures on election data. Each device or module that creates election data has its own private signing key, which corresponds to one of the public keys as described above, and a certificate generated by the Privacy CA 208 that contains the corresponding public key for the device. Typically, the Privacy CA generates and distributes certificates during pre-election set-up.

In a useful embodiment, certificates also contain the reference EC of the associated component or device. In particular, the EA Certificate 210 contains the EC of the Election Authority Server 202, and each device certificate contains the EC of its device. Reference ECs are used compare actual machine state with expected machine state, as described hereinafter in further detail in connection with FIG. 13L.

In FIG. 2, a Central Tally Application 214 also runs on the Election Authority Server 202. This application tallies the election results using the data reported by precinct voting systems. The Central Tally Application 214 typically runs after polls close in an election.

In an alternate embodiment, the Election Authority Server and one or more of its applications can be on-line during an election. In another embodiment, the Election Authority Server can run other applications to help manage or administrate an election, including but not limited to, user management tools, network management tools, and election data archiving tools.

Referring further to FIG. 2, the Publication Server 204 provides a way for the Election Authority to distribute election data to the general public. In particular, the Election Authority can distribute Privacy CA certificates 216, Generated VAT Lists 218, Spoiled VAT Lists 220, Ballot Bundle Lists 222, Hashed Ballot Lists 224, and various types of Tallies 226. Generally speaking, the Publication Server provides all the election data needed for members of the public to verify election results. In a preferred embodiment, the Publication Server is implemented as one or more web servers.

In a useful embodiment, the lists of certificates 222, Generated VAT Lists 218, Spoiled VAT Lists 220, Ballot Bundle Lists 216, Hashed Ballot Lists 224, and various types of Tallies 226 are all published as List Bundles (LBs). LBs contain a list of election data entries, the EC of the device that created the list, the signature of the creating device over the preceding data, and the EA generated certificate for the creating device. LB creation is discussed in further detail in connection with FIG. 15. Herein, all published lists are assumed to be LBs.

Figure 3:
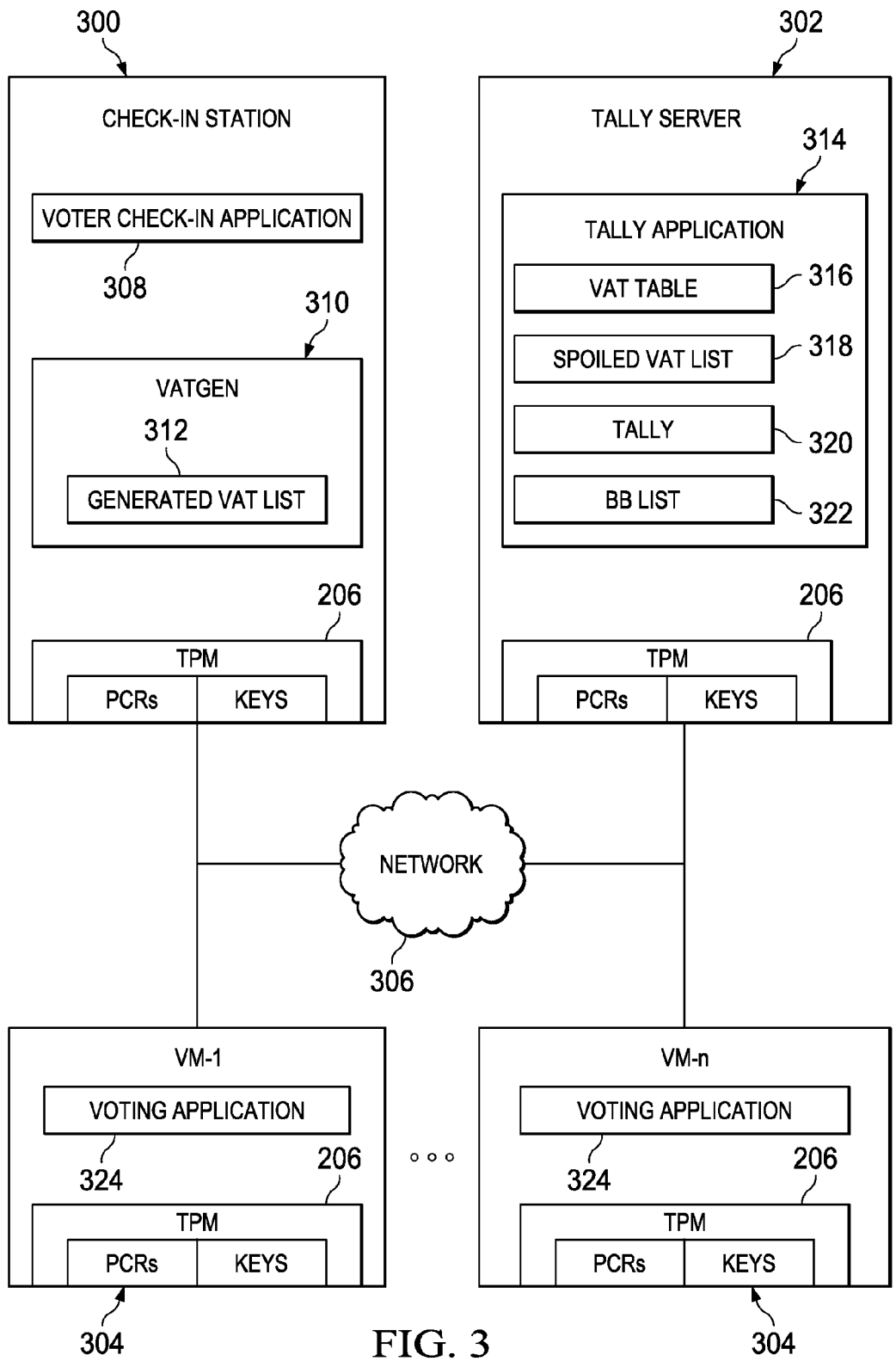
FIG. 3 is a block diagram showing components of a system for use by voters to cast ballots in an election, in accordance with an embodiment of the invention.

FIG. 3 shows a generic precinct election system, which defines the basic architecture of the voting system components that reside at polling places. The main components in a precinct system are the voter Check-In Station 300, a Tally Server 302, one or more Voting Machines 304, and a local network 306 over which local precinct components can communicate with each other. In a useful embodiment, each hardware device uses a Trusted Platform Module (TPM) chip 206 to implement the facilities of a Trusted Computing Platform as defined by the Trusted Computing Group. Each device defines an Election Configuration (EC), which is the configuration that the device must be executing in order for the device to participate in the election system. In addition, all devices in a precinct perform a TPM-managed mutual attestation protocol when they communicate with any other device. All communication between devices in a precinct uses the local network 306.

Check-In Station 300 is the first point of contact that voters have with the voting system when they enter the polling place. The Check-In Station runs the Voter Check-In Application 308 and is usually manned by a poll worker. The poll worker uses the Voter Check-In Application to authenticate and authorize voters. Authentication establishes the identity of a voter and authorization determines whether the voter can vote in the particular election and at the polling place. Voter authentication and authorization can be performed using conventional technologies known to those of skill in the art.

Check-In Station 300 also contains the VATGEN module 310, which is responsible for generating Voter Authorization Tokens (VATs) when requested by the Voter Check-In Application. Each VATGEN module maintains a Generated VAT List 312, which records each VAT created by the module.

Tally Server 302 provides the main recording and counting functions for the precinct. A tally application 314 has a VAT Table 316 that consists of records containing a voter access code, VAT, received timestamp, and status fields. This table is used to manage the balloting process, from voter check-in to when a voter casts a ballot. A Spoiled VAT List 318 contains all VATs that were issued by VATGEN 310 but were not used. The Tally 320 subcomponent accumulates the votes for each contest in an election. A Ballot Bundle List 322 contains the ballots cast by respective voters in the precinct. A Tally Server 302 also provides conventional administrative, logging, and auditing tools, so that election data can be properly managed (not shown).

Referring further to FIG. 3, each Voting Machine 304 provides a user interface, through which voters make their selections and cast their ballots. Each Voting Machine runs a Voting Application 324 that displays ballots to voters and captures voter selections.

In some embodiments, Voting Machines may keep at least one copy of the ballots cast by voters. In a useful embodiment, the network 306 is wired and does not allow unauthorized devices to be easily connected. In another embodiment, the network allows for limited communication with remote voting system devices, such as the Election Authority Server 202 of FIG. 2. In other embodiments, at least one of the functions of the Tally Server 302 can be distributed to at least one Voting Machine 304. In one embodiment, all Tally Server functions are distributed to at least one Voting Machine, such that a separate Tally Server device is no longer required.

Figures 4A, 4B:
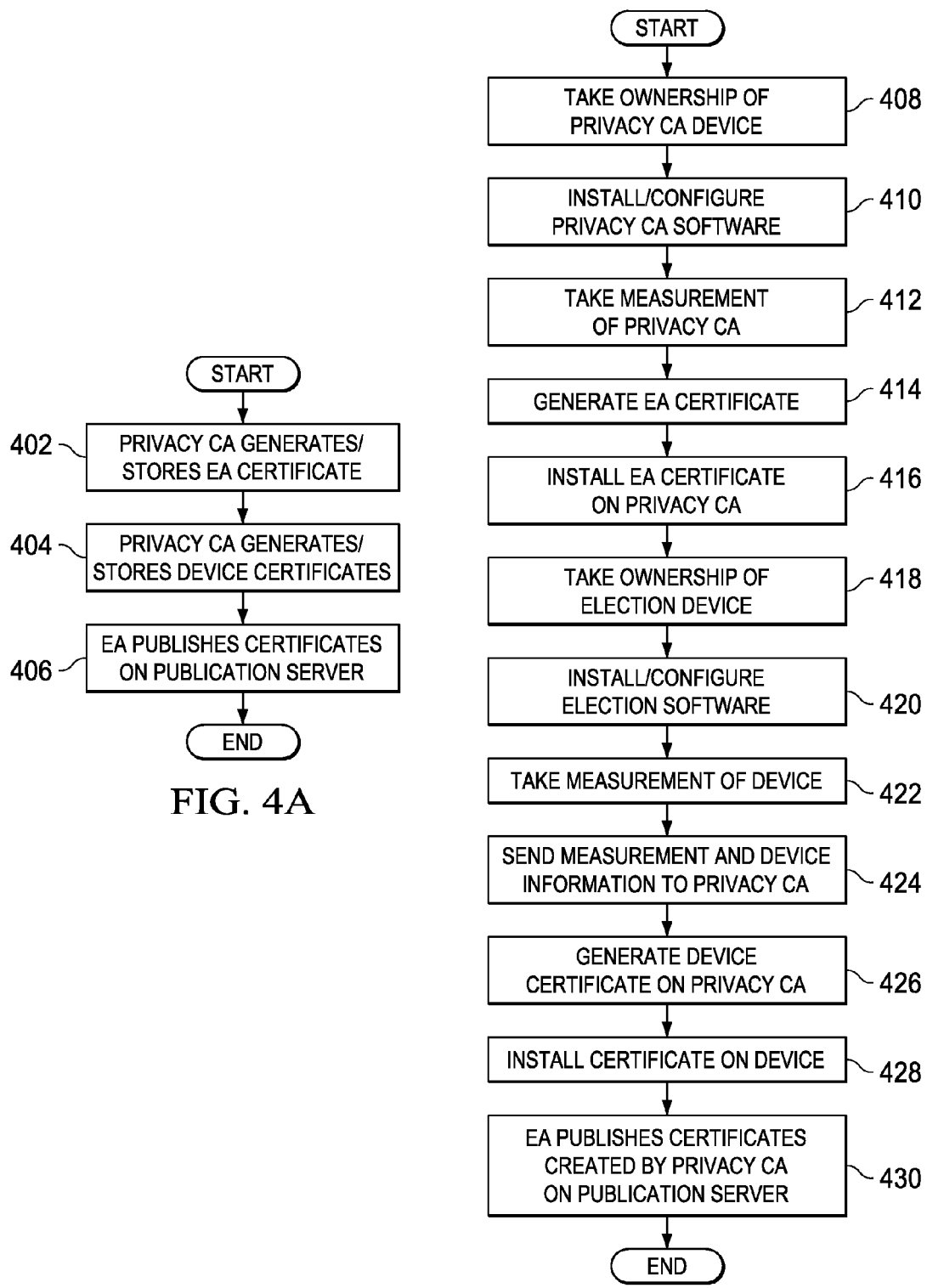
FIGS. 4A-4B are flowcharts illustrating the creation and publication of certificates for an embodiment of the invention.
Figure 5:
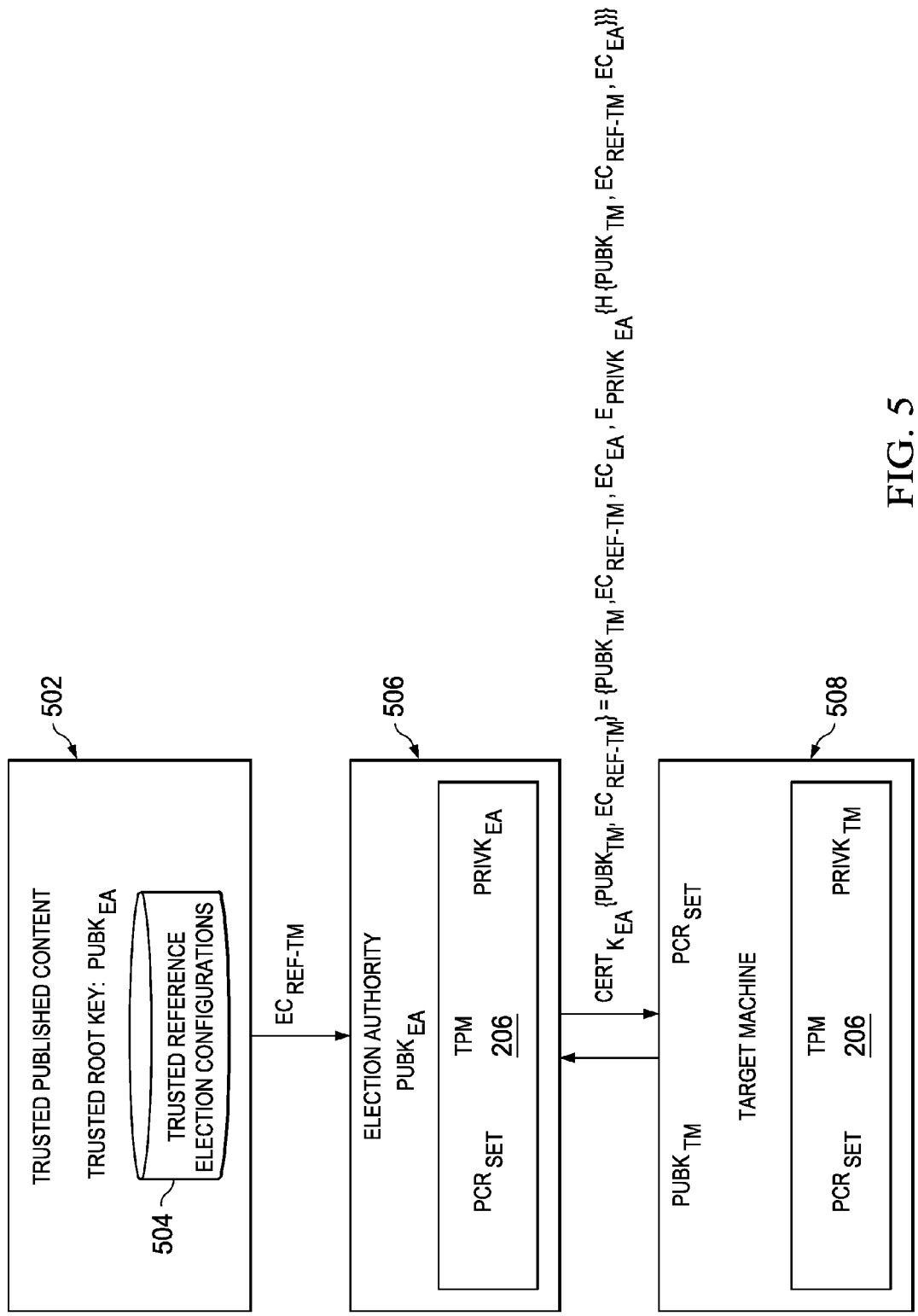
FIG. 5 is a schematic diagram further illustrating creation and publication of certificates for an embodiment of the invention.

FIG. 4A shows a high-level process for publishing certificates. The first task 402 is to generate or acquire an Election Authority Certificate 402; the second task 404 is to generate and store certificates for each device; and the final task 406 is to publish the certificates in an appropriate place. FIG. 5 shows further details of a certificate.

FIG. 4B shows the subprocess of generating or acquiring the EA Certificate (task 402). The Privacy CA 208 runs on the Election Authority Server 202, so the first step 408 is to take ownership of that server. The process of taking ownership of a device is defined by the Trusted Computing Group as initializing a Trusted Computing Platform. In a useful embodiment, the TPM on the Election Authority Server is configured with its initial keys as part of the taking ownership process. Included in these initial keys is the EA signing key pair.

After taking ownership of the EA Server, the Privacy CA, Central Tally Application, and any related software is installed on the server at step 410. At this point, the device is booted into its Election Configuration, such that only the required election software is executing, and a measurement is taken at step 412. To generate an EA certificate at step 414, this measurement is captured and incorporated into the EA Certificate along with the EA public signing key. The EA Certificate is self-signed using the EA private key, and is then installed on the Privacy EA at step 416.

The EA Certificate contains the EA public key and EA EC data. This certificate represents the root of trust in the voting or election system. The EA Certificate must be generated in an execution environment whose integrity is not compromised. For example, the Election Authority Server should be physically disconnected from any network when the EA Certificate is generated. In one embodiment, a new version of the operating system is obtained from a trusted source, verified as being unaltered, and installed. Next, the election software is installed. This election software should also come from a trusted source and have its content verified before installation. At this point, the server can be booted into its EC and a measurement taken.

In another embodiment, a trusted third party, such as a commercial Certificate Authority, would be used to generate and sign the EA Certificate. Even in this case, the integrity of the Election Authority Server must still be guaranteed when measurements are taken.

FIG. 4B further shows how device certificates are generated after the EA Certificate is installed in the Privacy CA. Certificates are generated for each device in an election system. Devices, as used herein, includes all Publication Servers 204, Check-In Stations 300, Tally Servers 302, Voting Machines 304, and any other device that is part of the voting or election system. Each of these devices usefully runs as a Trusted Computing Platform.

Following step 416 of FIG. 4B, ownership of a device is taken at step 418 by initializing the Trusted Computing Platform. In a useful embodiment, the TPM on the device is configured with its initial keys as part of the process 418. Next, the election software required by that type of device is installed, at step 420. The device is booted into its Election Configuration and a measurement is taken at step 422. This measurement information and the public signing key of the device are sent to the Privacy CA at step 424, in a certificate creation request. The Privacy CA generates the device certificate at step 426, stores it, and sends the certificate back to the requesting device. Finally, the device installs and stores its new certificate in a place accessible to the election software that it runs.

In one embodiment, the device and Privacy CA are temporarily connected to the same network to exchange data, in connection with steps 424 and 428. This communication between the device and Privacy CA can use various techniques to guarantee the integrity of the transmitted data, including but not limited to MAC address filtering, IP address filtering, physical port filtering, and data encryption. In another embodiment, the device and Privacy CA exchange data at steps 424 and 428 uses portable media as temporary storage. This communication path can be secured using conventional techniques. In another embodiment, more than one certificate can be generated for each physical device. Multiple certificates allow different subsystems that run on a device to have their own identity and key sets. Multiple certificates can also be used to give a single subsystem multiple identities.

FIG. 4B further shows, at step 430, how the Election Authority can publish the certificates created by the Privacy CA on a Publication Server. In a useful embodiment, the Publication Server is a web server that allows public access. As discussed above in regard to FIG. 3, the EA publishes the certificate list as a List Bundle that protects the integrity of the list and ties the list to a trusted state of the EA Server 202. In a further embodiment, all tasks discussed in connection with FIGS. 4A-B occur before an election as part of election preparation.

FIG. 5 illustrates the certificate creation process. Trusted Published Content 502 contains a mechanism 504 for publishing Trusted Reference Election Configurations, denoted by $EC_{REF-TM}$, where TM is the target machine type to which the Election Configuration applies. $EC_{REF-TM}$ is an abstract representation or description of the expected Election Configuration of a target machine type, such as one of the devices of the voting system. This representation could be an octet-for-octet listing of the system logs and PCR values; it could be a human-readable description of what processes should be running in what order; or it could be any other information that would allow the public to verify the integrity of the target machines, given their actual Election Configuration data.

A Trusted Root Key in Content 502 is also published. This key is the Election Authority public key, $PUBK_{EA}$, which in preferred implementations is associated with an identity key (e.g. AIK) maintained by the Trusted Computer Platform. Trust in this key is implicit in the model discussed herein. In practice, trust in this key might be established by virtue of the fact that it is widely disseminated through various media channels, and confirmed to be correct through a transparent auditing procedure. Alternatively, the Trusted Root Key could be vouched for in a certificate issued by another implicitly trusted entity. In any event, trust in this key must ultimately be established through appropriate social means.

As described above, the Election Authority (EA) 506 issues all certificates for all other system components. The public keys and reference Election Configurations for these components are contained in the certificates, which themselves are signed in such a way that the Election Configuration of the Election Authority itself are bound to the certificate. FIG. 5 illustrates an embodiment of this procedure, which includes the public key (PUBK$_{TM}$) of the target machine, the reference Election Configuration of the target machine 508, and the actual Election Configuration of the Election Authority 506 in the dataset signed to form the certificate. In a useful embodiment, the target machine 508 then receives and stores its signed certificate; however, this signed certificate may be later obtained from any source, trusted or untrusted. FIG. 5 shows the EA-generated certificate CERT$_{KEA}${PUBK$_{TM}$, EC$_{REF-TM}$}.

Figure 6:
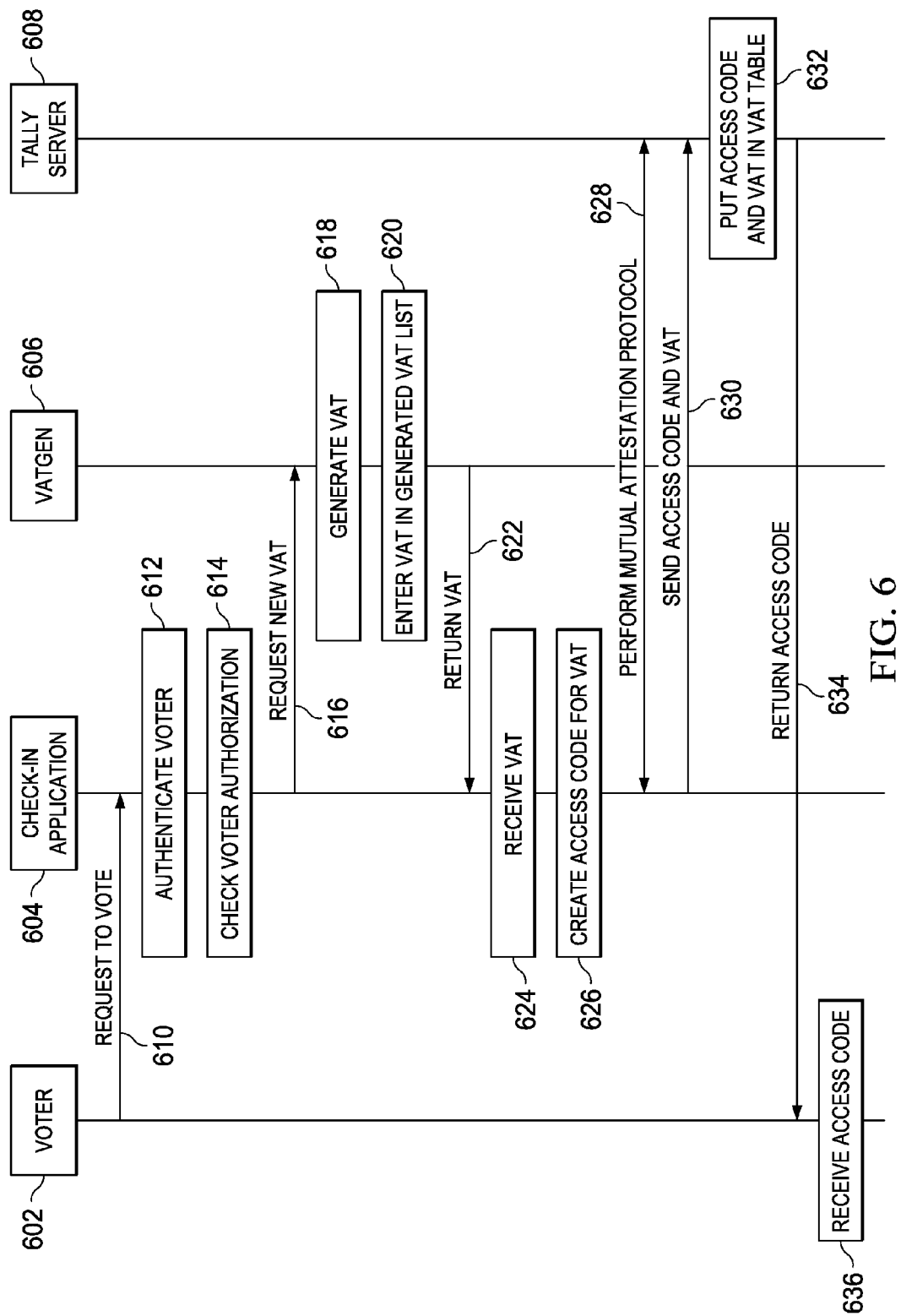
FIGS. 6 and 7 are schematic diagrams illustrating generation of voter authorization tokens (VATs) for an embodiment of the invention.

FIG. 6 shows how Voter Authorization Tokens (VATs) are generated when a voter checks in at a polling place. The participants in this process are a voter 602, the Check-In Application 604 that runs on the Check-In Station, the VAT-GEN module 606 that also runs on the Check-In Station, and a Tally Server 608.

The voter enters the precinct and submits a request to vote 610. Reference numbers 610-636 are used herein to represent respective tasks. A poll worker uses the Check-In Application to authenticate the voter's identity at 612, and to verify that the voter is authorized to vote in the election at that time and place (614). Embodiments of the invention do not restrict or interfere with conventional authentication and authorization procedures that are used for these tasks.

Figure 7:
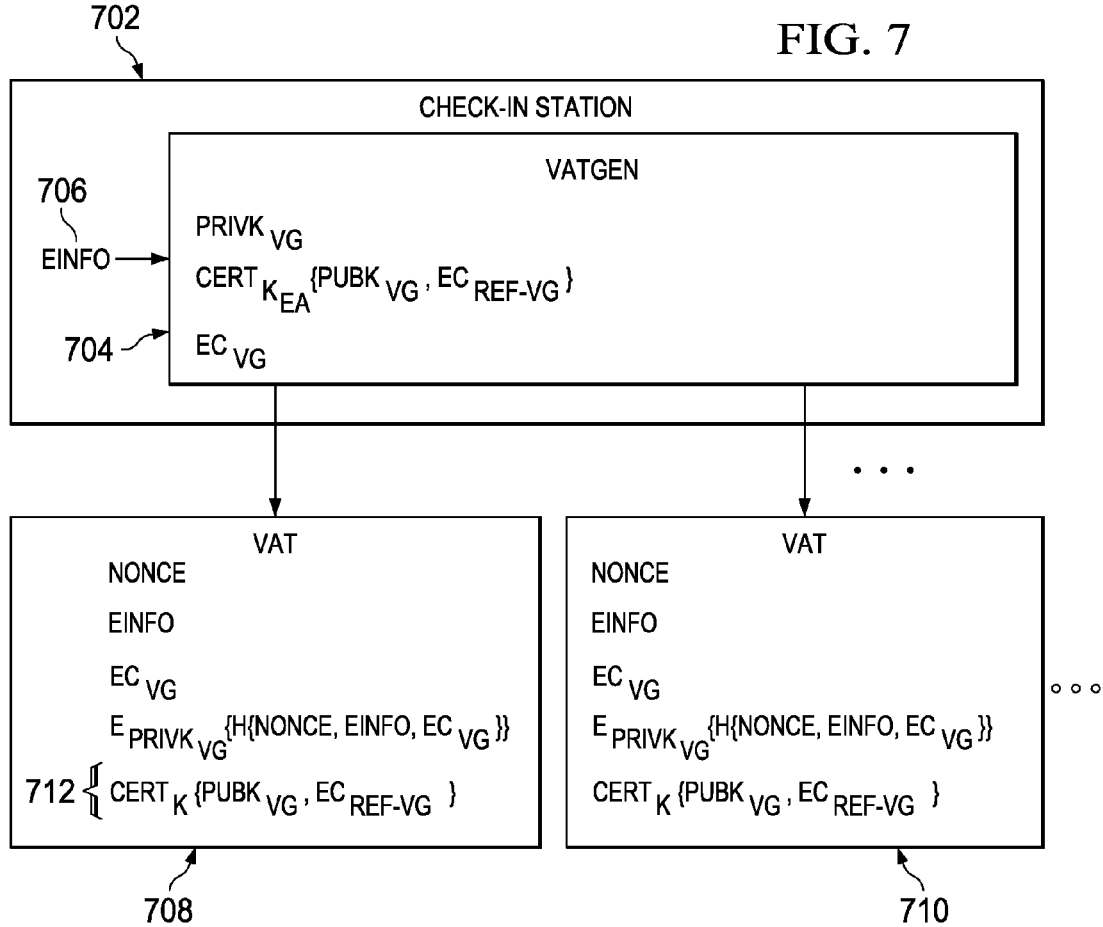

Once the voter is authenticated and authorized to vote, the Check-In Application sends a new VAT request at 616 to the VATGEN module 606. The request can contain any election information, though this information often includes the election name and the ballot style that the voter is authorized to use. The ballot style determines exactly in which contests the voter is eligible to make selections. When VATGEN 606 receives the request, it generates a new VAT at 618, enters that VAT in its Generated VAT List at 620, and returns the VAT to the Check-In Application at 622. FIG. 7 shows further details of VAT creation.

Figure 16:
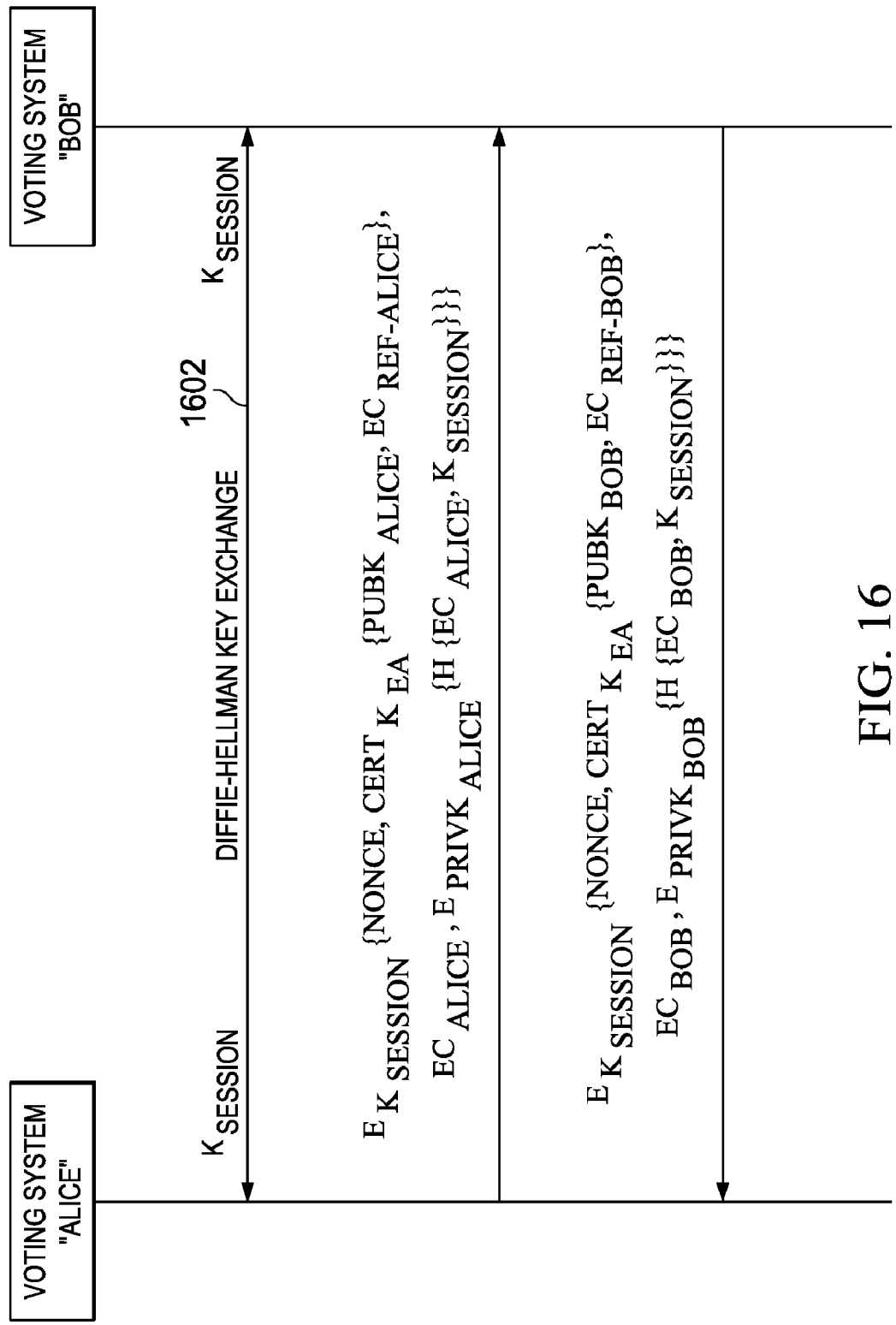

When the Check-In Application 604 receives the newly created VAT at 624, it generates a unique, random access code that it associates with the VAT, as shown by task 626. This access code is typically a four or five character code with a short lifetime, such as a half hour. After creating the access code, the Check-In Application initiates a transaction with the Tally Server 608. The first step in any network transaction in a trusted electronic voting system is to execute a mutual attestation protocol 628 between the communicating devices. This protocol uses the facilities of the Trusted Computing Platform to assure that only the code specified in the Election Configuration of each machine is currently loaded in that machine. FIG. 16 shows further details of the mutual attestation protocol.

Once the mutual attestation protocol succeeds, the Check-In Application sends the new VAT and its associated access code at 630 to the Tally Server 608. The Tally Server receives the request and inserts a new record in its VAT Table as shown by task 632. A VAT Table record includes a VAT, an access code, a received timestamp, and a status field. The status field is initially set to unused. The exact format of the table, the data structures used, and field values used are implementation dependent and well-understood by those practiced in the art of software development.

Figure 13A:
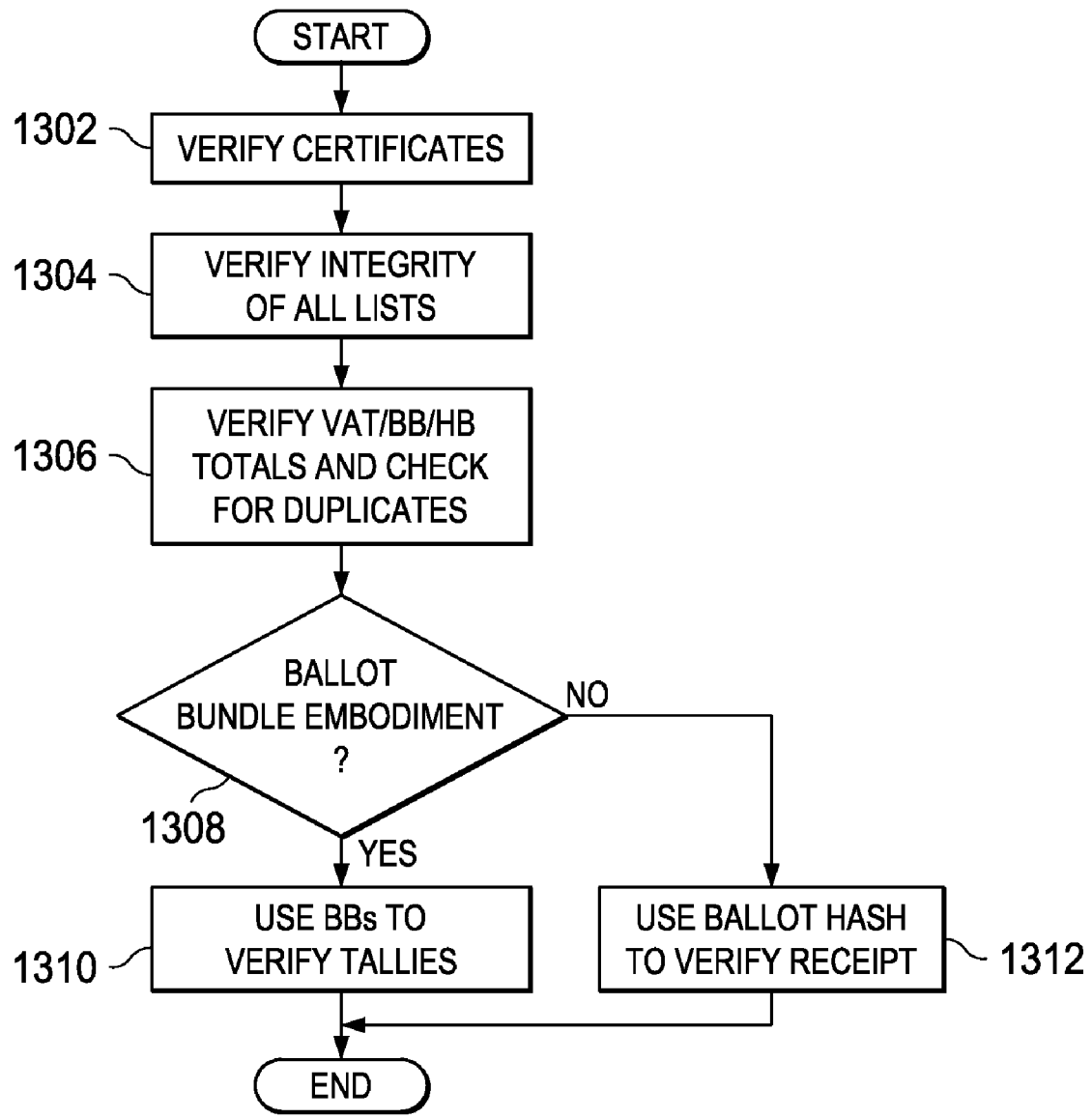
FIGS. 13A-13E are flowcharts that respectively show selected steps of a procedure for verifying election results, in an embodiment of the invention.
Figure 13B:
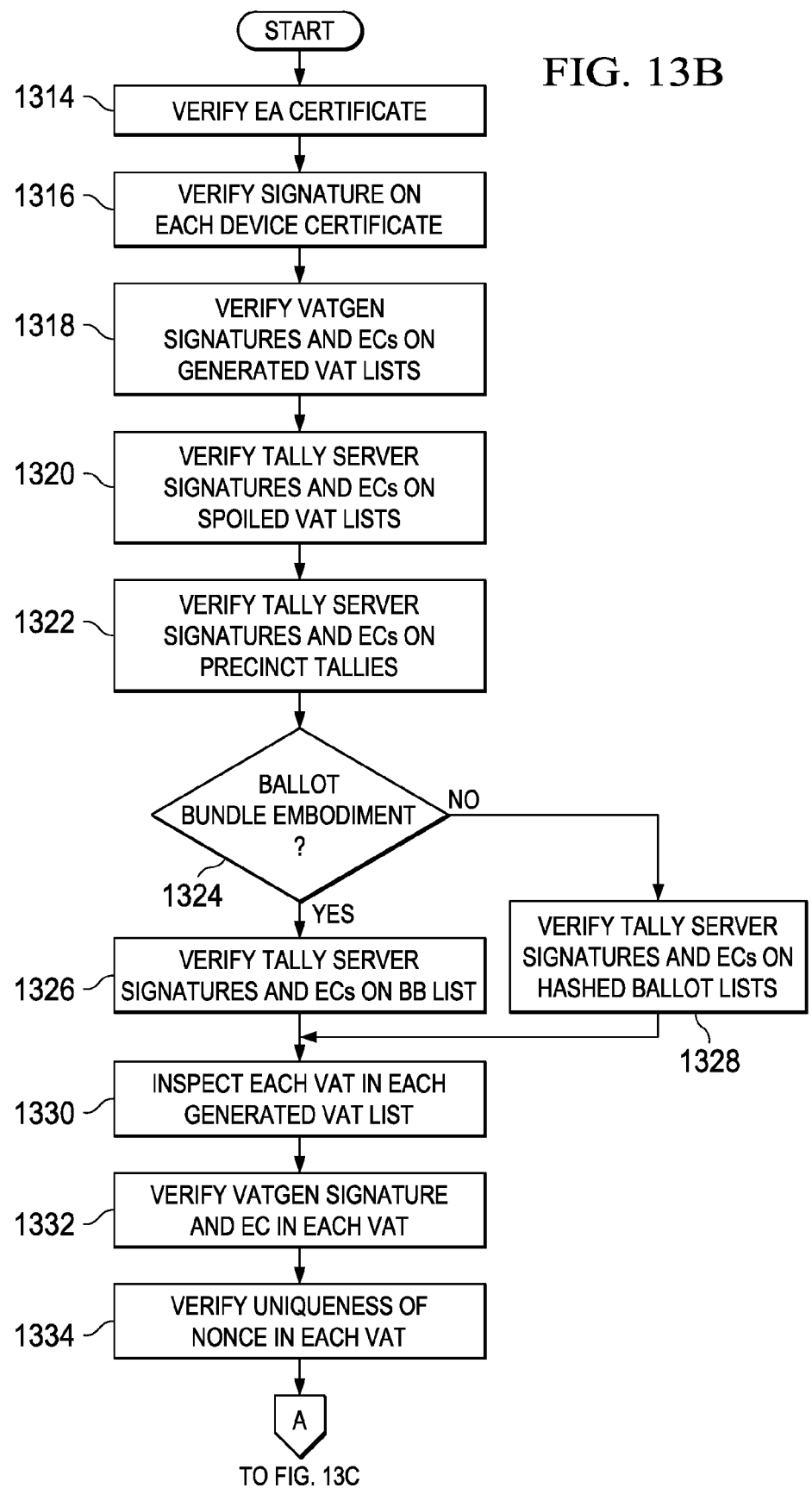
Figure 13C:
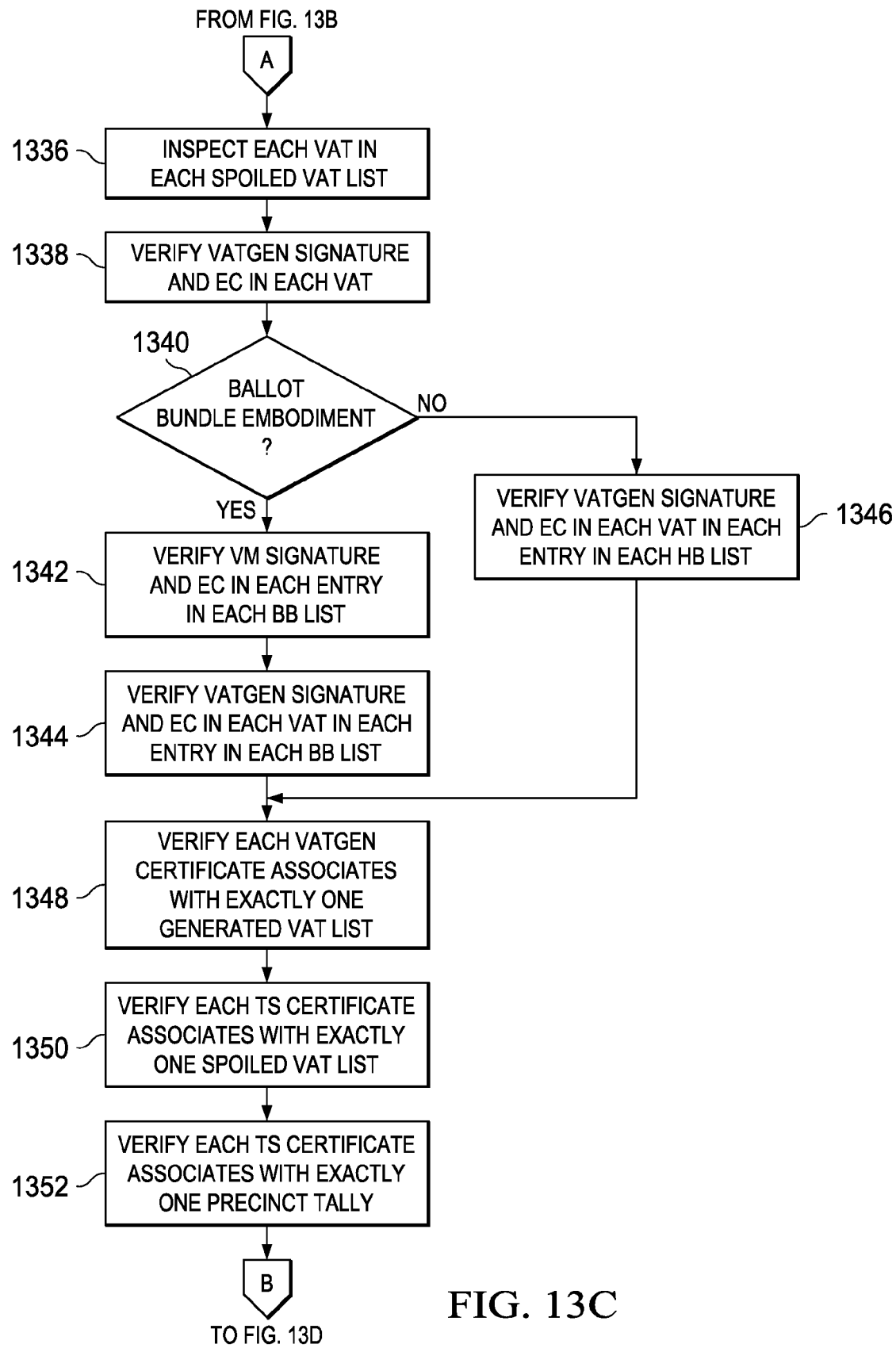
Figure 13D:
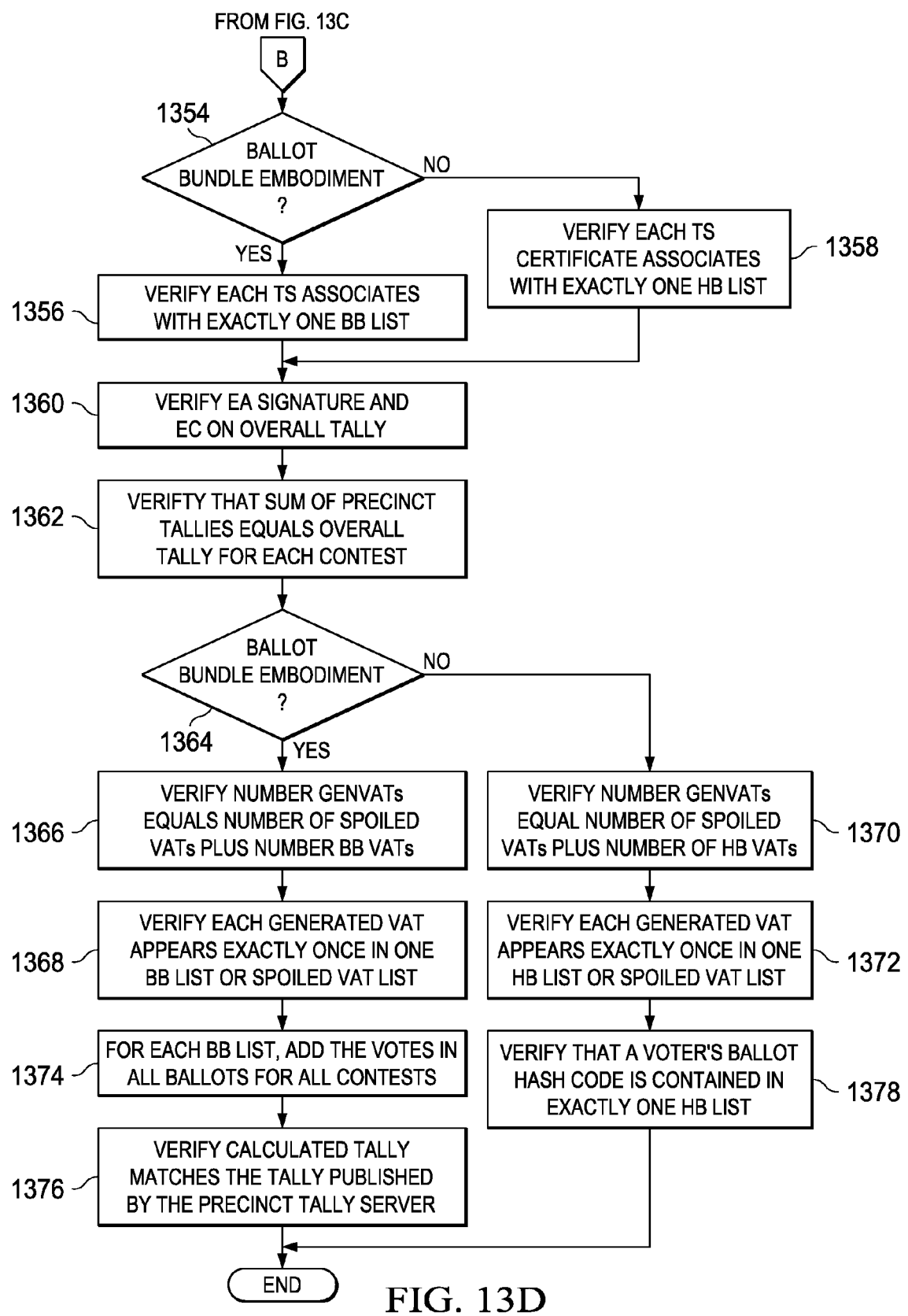

In useful embodiments, the Tally Server verifies that the VAT was correctly constructed by a known and trusted VAT-GEN module, as further discussed at FIG. 13D.

On successful completion of the transaction with the Tally Server 608, the Check-In Application 604 presents the voter with the access code at 634, which will be used by the voter to access a voting machine. The voter can receive the access code at 636 either verbally, on a display, on paper, or on portable storage media, depending on the implementation.

FIG. 7 illustrates the Voter Authorization Token (VAT) generation procedure. A Check-in Station 702 and its VAT-GEN module 704 retrieve the Election Information (EINFO) 706 and binds that, along with a randomly generated nonce that the particular Check-in Station 702 has never used before, to its own actual Election Configuration EC$_{VG}$ in order to form a VAT 708 or 710. In a useful embodiment, the VAT also contains the signed certificate 712 to expedite establishment of trust in the Check-in Station's key. In addition, a useful embodiment generates a unique nonce for each new VAT.

Figure 8:
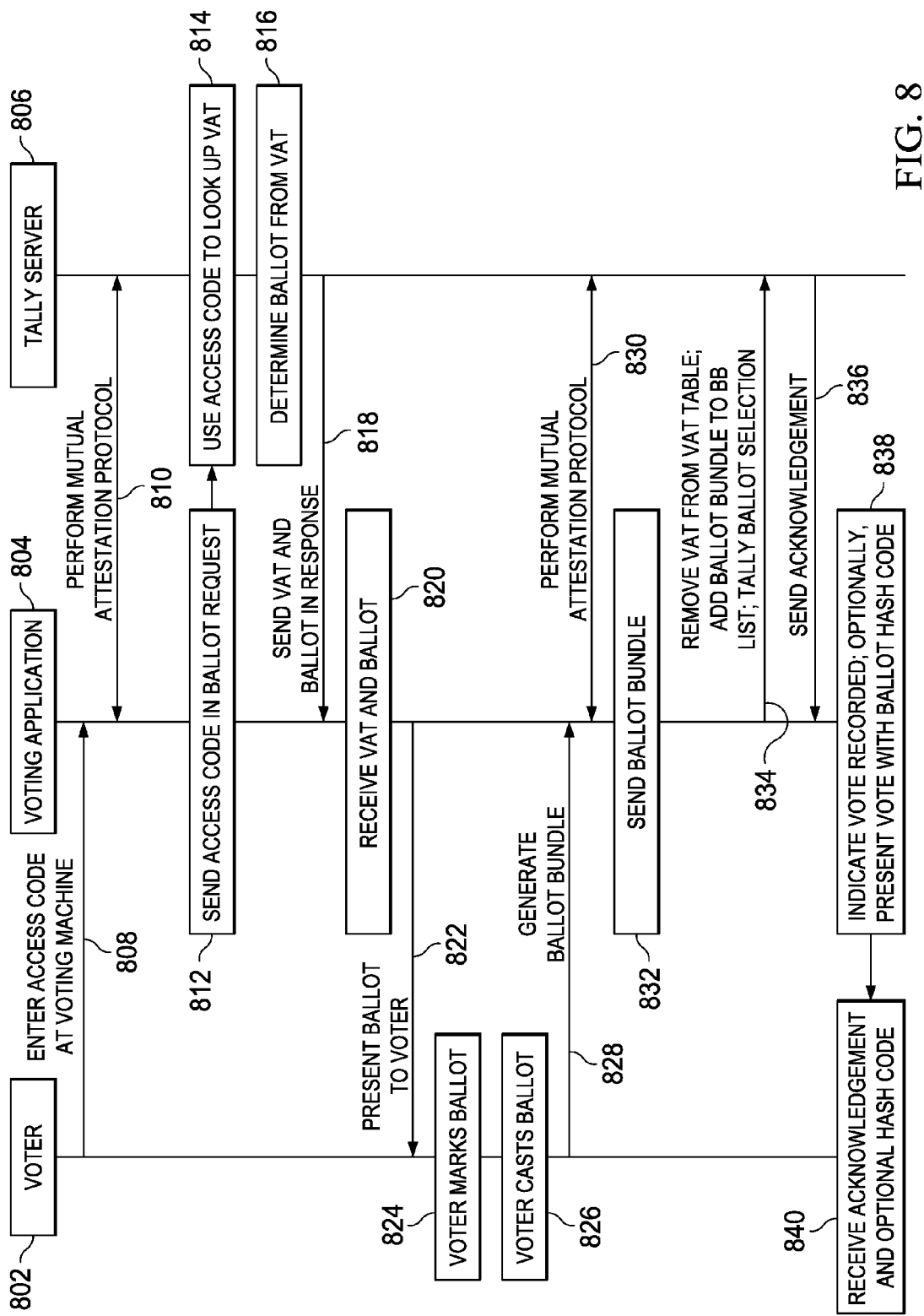
FIGS. 8 and 9 are schematic diagrams depicting generation of ballot bundles for an embodiment of the invention.

FIG. 8 shows how a Ballot Bundle (BB) is generated as a result of a voter casting a ballot. The participants in this process are a voter 802, a Voting Application 804 that runs on a Voting Machine, and a Tally Server 806. Tasks carried out in generating a Ballot Bundle are indicated by reference numbers 808-840.

The voter 802 enters into a Voting Application 804 the access code he or she received at the Check-In Station, shown as task 808. The Voting Application 804 receives the access code and initiates a transaction with the Tally Server 806 to retrieve the voter's VAT and ballot. The first step in any network transaction in a trusted electronic voting system is to execute the mutual attestation protocol 810 between communicating devices, shown by task 810. This protocol uses the facilities of the Trusted Computing Platform to assure that only the code specified in the Election Configuration of each machine is currently loaded in that machine.

Once the mutual attestation protocol succeeds, the Voting Application 804 sends a ballot request that contains the voter access code to the Tally Server at 812. The Tally Server 806 receives the request, and uses the access code to look up the associated VAT in its VAT Table at 814. If no VAT is associated with the code, the ballot request fails. The most common reasons for a request to fail is that a time period for the VAT has expired or the VAT has already been used. Expired VATs are discussed hereinafter.

If the VAT associated with the access code is found, the Tally Server examines the VAT to determine which ballot should be presented to the voter at 816. The Tally Server then sends the VAT and the appropriate ballot in a response to the Voting Application at 818. The Tally Server also sets the status field associated with the VAT in its VAT table to in-use. In a useful embodiment, ballots are pre-loaded or cached on voting machines to reduce network traffic.

When the Voting Application receives the voter's VAT and ballot at 820, the application presents the ballot to the voter at 822. The voter marks the ballot with his or her selections at 824 and then casts the ballot at 826.

Figure 9:
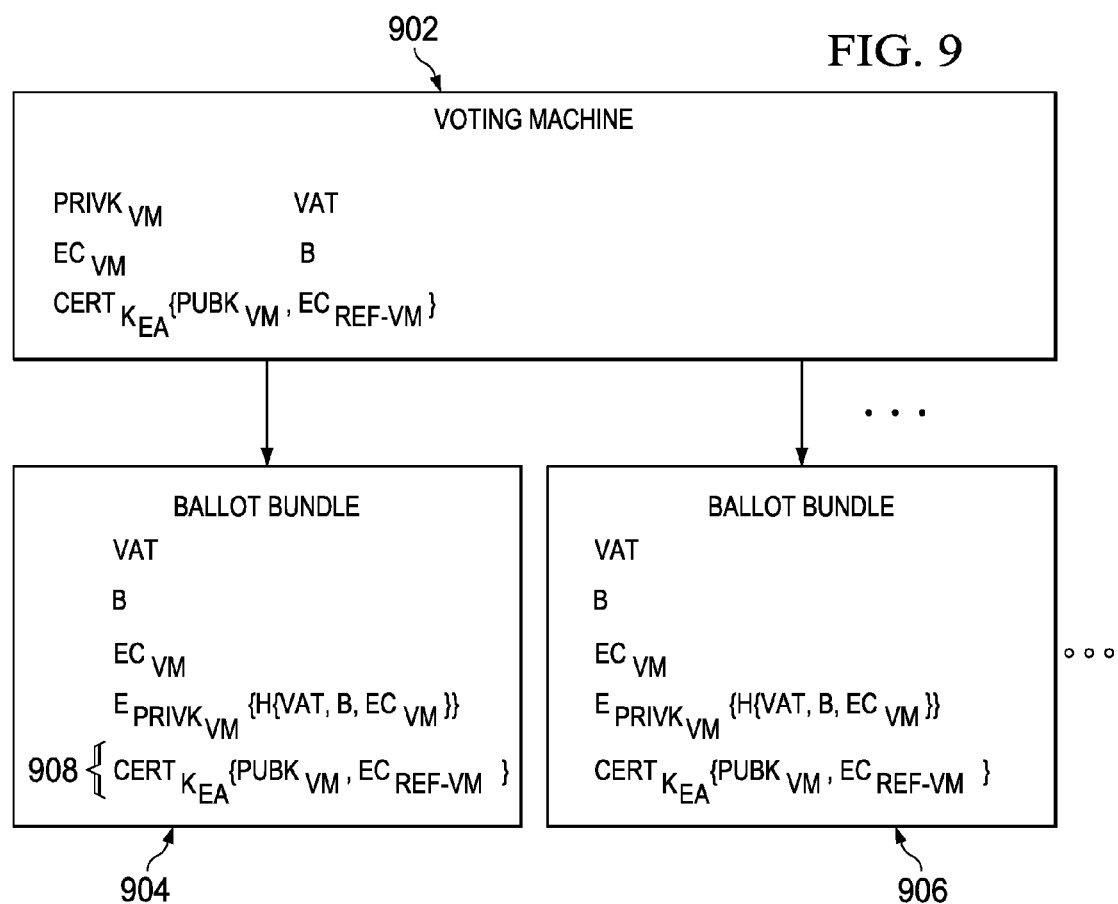

The Voting Application 804 inserts the VAT and the marked ballot into a new Ballot Bundle at 828. FIG. 9 shows further details of how a Ballot Bundle is created. The Voting Application then initiates a new request to the Tally Server 806 by performing the mutual attestation protocol with the Tally Server at 830. The attestation protocol serves the same purpose in this request as it did in the previous request to the Tally Server.

Once the mutual attestation protocol succeeds, the Voting Application sends the Ballot Bundle to the Tally Server at 832. The Tally Server 806 receives the request, removes the VAT in the request from the VAT table; adds the Ballot Bundle to the BB List; and tallies the ballot selections at 834.

In useful embodiments, the Tally Server verifies that the VAT and Ballot Bundle are well constructed and that they originate from devices known to be part of the trusted electronic voting system. Verification of VAT signatures and Ballot Bundle signatures is discussed hereinafter in further detail, in connection with FIGS. 13D and 13F, respectively.

Once bookkeeping is complete, the Tally Server sends an acknowledgment response to the Voting Application at 836. The Voting Application indicates to the voter that his or her ballot has been accepted at 838. If the voting system is executing the Hashed Ballot Embodiment, then the Voting application presents the voter with a hashed ballot code as discussed above. The voter receives the vote cast message and optional hashed ballot code, as shown by task 840.

FIG. 9 illustrates the Ballot Bundle (BB) generation procedure. A Voting Machine (VM) 902 binds the VAT and the Ballot (B) to its actual Election Configuration $EC_{VM}$ in order to form a BB 904 or 906. In a useful embodiment, the BB also contains the signed certificate 908 of the Voting Machine 904, to expedite establishment of trust in the VM's key.

Figure 10:
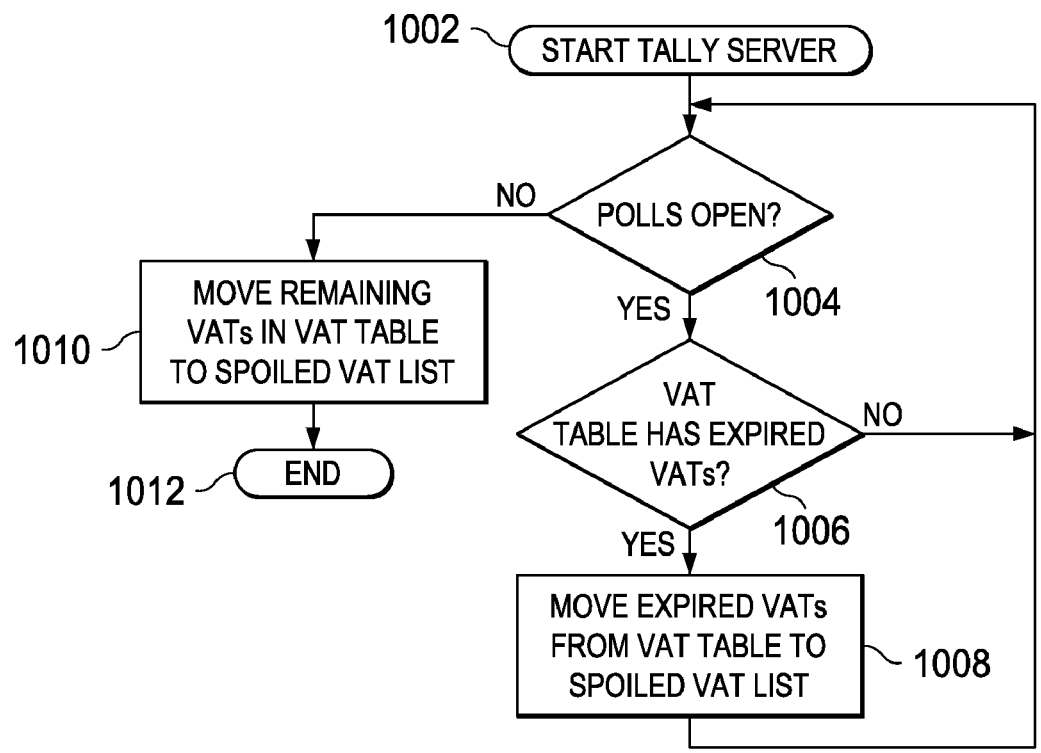
FIG. 10 is a flowchart illustrating a procedure for saving spoiled VATs in an embodiment of the invention.

FIG. 10 shows the logic implemented by the Tally Server to determine when a VAT is spoiled. After the Tally Server initializes at step 1002, it begins executing the loop defined by decision box 1004. When the election is underway and the polls are open, the yes path from the decision step 1004 is taken. This path leads to decision box 1006, which determines whether any VATs in the VAT Table have expired. If at least one VAT has expired, then the yes path from the decision box 1006 is taken. The Tally Server moves all expired VATs from the VAT Table to the Spoiled VAT List at step 1008. If no VAT has expired, the no path from the decision box 1006 is taken and decision box 1006 is visited again.

When voting is over and the polls close, the no path from the decision box 1004 is taken. Any VATs still in the VAT Table when polls close are moved to the Spoiled VAT List, at step 1010. Spoiled VAT List insertion ends at 1012.

A useful embodiment uses interrupt and timer mechanisms to implement the 1004 and 1006 decision boxes, in keeping with common software development practice.

Figure 11:
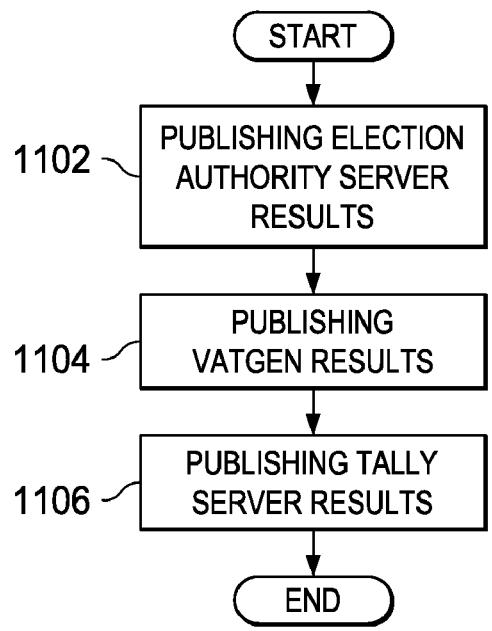
FIG. 11 is a flowchart showing selected steps of a procedure for publishing election results in an embodiment of the invention.

FIG. 11 shows a high-level overview of the process for publishing election results. More particularly, FIG. 11 shows the principal process steps of publishing Election Authority Server Results (1102); publishing results of VATGEN modules in the precinct systems (1104); and publishing results from the Tally Servers in the precinct systems (1106). Each of these steps is discussed in FIGS. 12A-C, respectively.

Figure 12A:
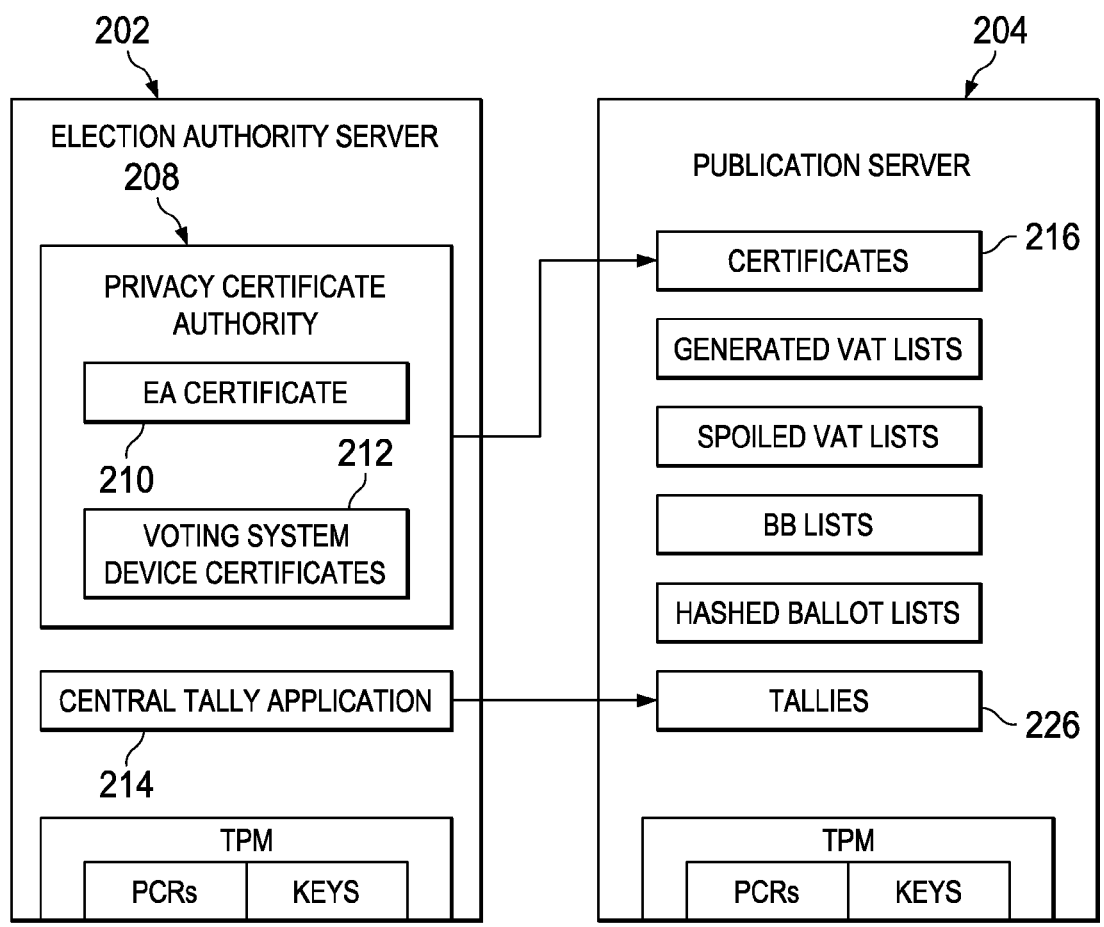
FIGS. 12A-12C are schematic diagrams that provide further detail for respective steps of the procedure of FIG. 11.

FIG. 12A shows the EA Server 202, wherein the data from server 202 gets published on the Publication Server 204. The Privacy CA application 208 publishes the EA certificate 210 and the device certificates 212 on the Publication Server 204. In a useful embodiment, these certificates are published before voting begins. The Central Tally Application 214 publishes the overall tallies of all contests in all precincts, as part of the Tallies 226 data on the Publication Server.

Figure 12B:
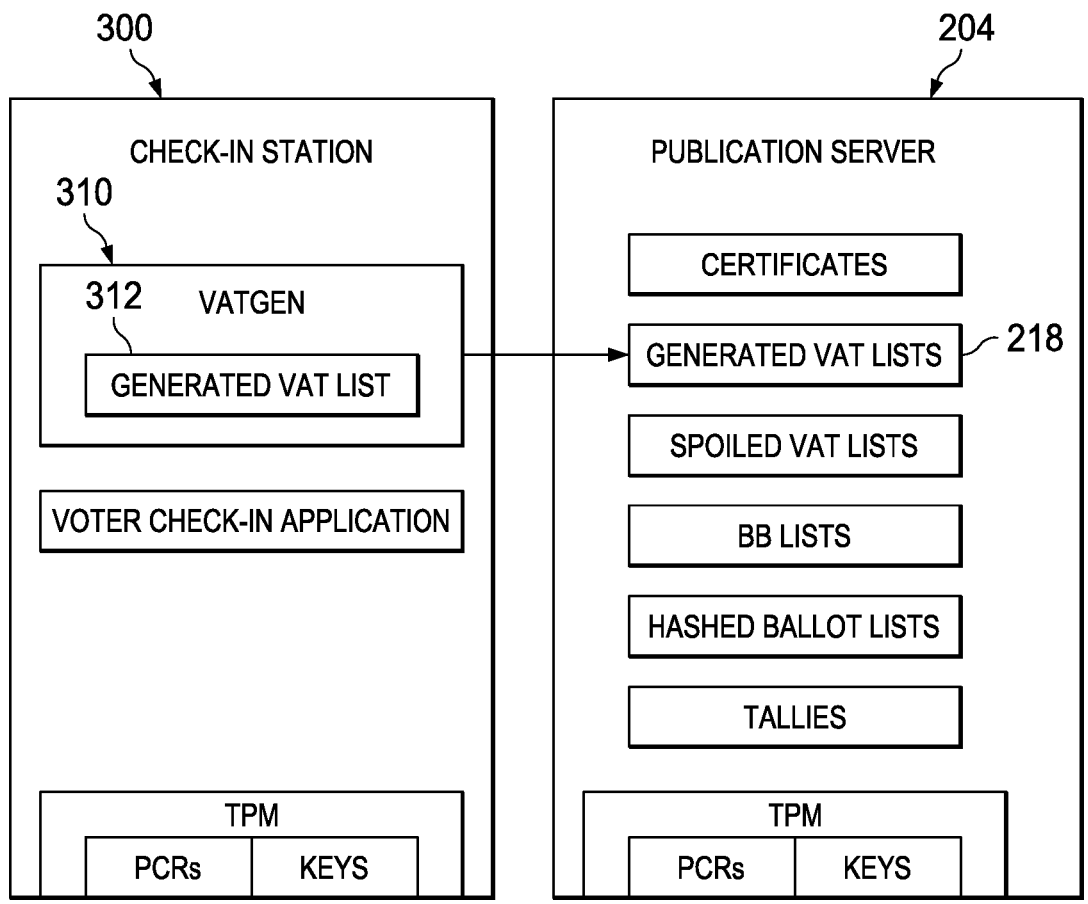

FIG. 12B shows a precinct Check-In Station 300 with its VATGEN module 310 that maintains a Generated VAT List 312. This list is published as part of the Generated VAT Lists on the Publication Server 204.

Figure 12C:
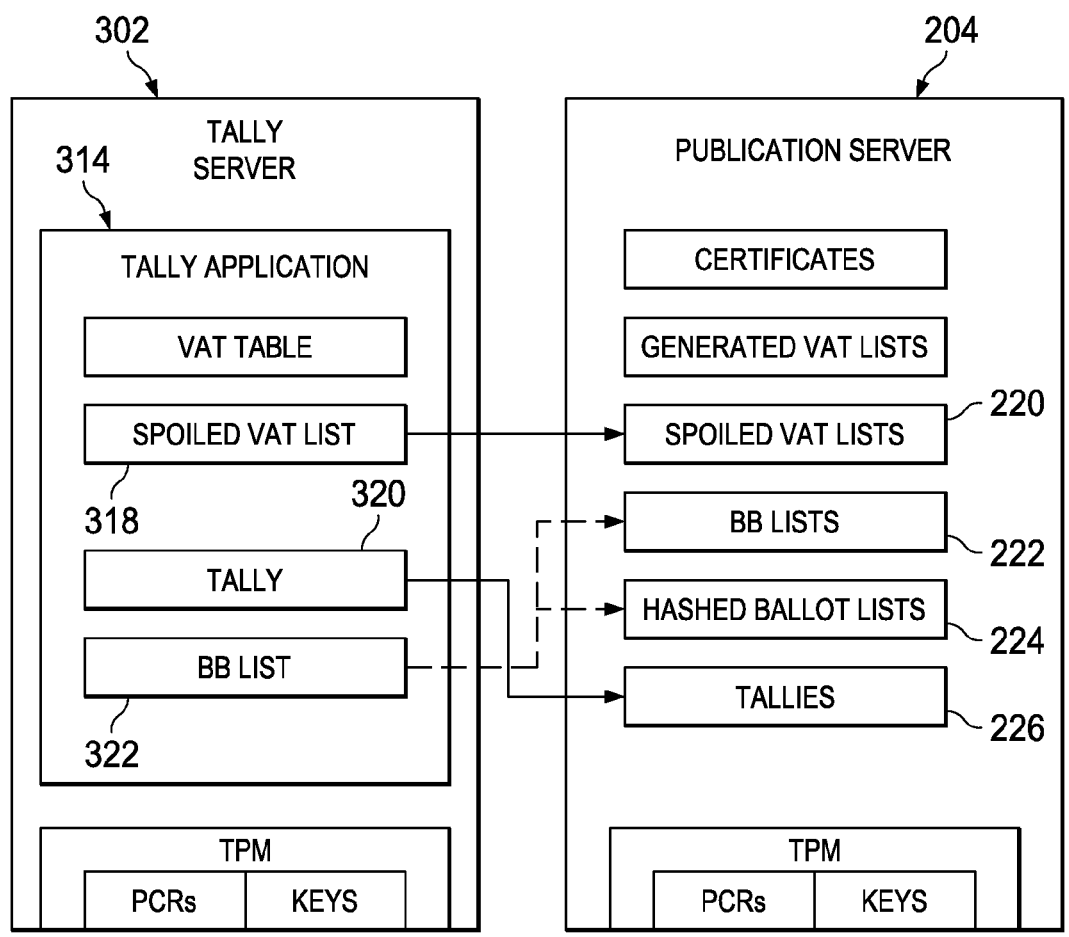

FIG. 12C shows a precinct Tally Server 302 with its Tally Application 314. The Spoiled VAT List 318 of the Tally Application gets published as part of the Spoiled VAT Lists 220 on the Publication Server 204. The Tally 320 of the Tally Application gets published as part of the Tallies 226 on the Publication Server. In the Ballot Bundle Embodiment, the BB List 322 of the Tally Application gets published as part of the BB Lists 322 on the Publication Server. In the Hashed Ballot Embodiment, information in the BB List 322 of the Tally Application gets published as part of the Hashed Ballot Lists 224 on the Publication Server.

As mentioned above in the Voting System Architecture section, the lists of certificates 216, Generated VAT Lists 218, Spoiled VAT Lists 220, Ballot Bundle Lists 222, Hashed Ballot Lists 224, and various types of Tallies are all published as List Bundles (LBs). LBs contain a list of election data entries, the EC of the device that created the list, the signature of the creating device over the preceding data, and the EA generated certificate for the creating device. LBs protect list integrity using a signature that is tied to the trusted state of a device in the system. LB creation is discussed in further detail in connection with FIG. 14.

The mechanism used to transfer election data from its source to the Publication Server is implementation dependent. Implementations can use staging areas, temporary network connections, portable media, or any other technique to move data to the Publication Server. Those versed in the art of software development can use any conventional means to safely and securely move election data to the Publication Server. Since all published data are signed using the facilities of the Trusted Computing Platform, any corruption of election data during transport is likely to be detected.

FIG. 13A shows a high-level overview of a process for verifying election results. The complete process comprises verification of certificates 1302; verification of list integrity 1304; verification of VAT, Ballot Bundle and Hashed Ballot totals 1306; and verification of either the tallies 1310 or hashed ballot receipts 1312, depending on the embodiment, as determined at decision box 1308. FIGS. 13B-13D illustrate these verification steps or subtasks in further detail. Those versed in the art will understand that different embodiments may allow for different subtask orderings without impacting the integrity of the system.

FIG. 13B at steps 1314 and 1316 shows the procedure for verifying certificates, which is typically the first verification procedure carried out. Besides descriptive information, certificates contain public keys and Election Configuration data as described above. The EA certificate is verified or checked using the EA public key contained in the EA Certificate at step 1314. This check consists of verifying the digital signature in the certificate, and a consistency check of the certificate. As previously discussed, the EA certificate and its contents represent a root of trust and must be obtained from a secure channel. The EA certificate is trusted because of how it is obtained, and not because of the signature it carries.

Once the EA public key is obtained from the EA certificate, all device certificates can be verified as shown by step 1316, by checking the signatures on those certificates using the EA public key. In a useful embodiment, all certificates are published and ready for verification before the election begins. The next verification step is to verify the integrity of the published lists, as shown by steps 1318-1328 of FIG. 13B.

Steps 1318-1328 show a high-level procedure for verifying the various published lists. List verification consists of checking the integrity of each list as a whole, and then checking the integrity of each element in each list. The first check guarantees that the elements have not been added to the list, deleted from the list, or modified while in the list. The second check verifies that the list contains valid elements.

Figure 14:
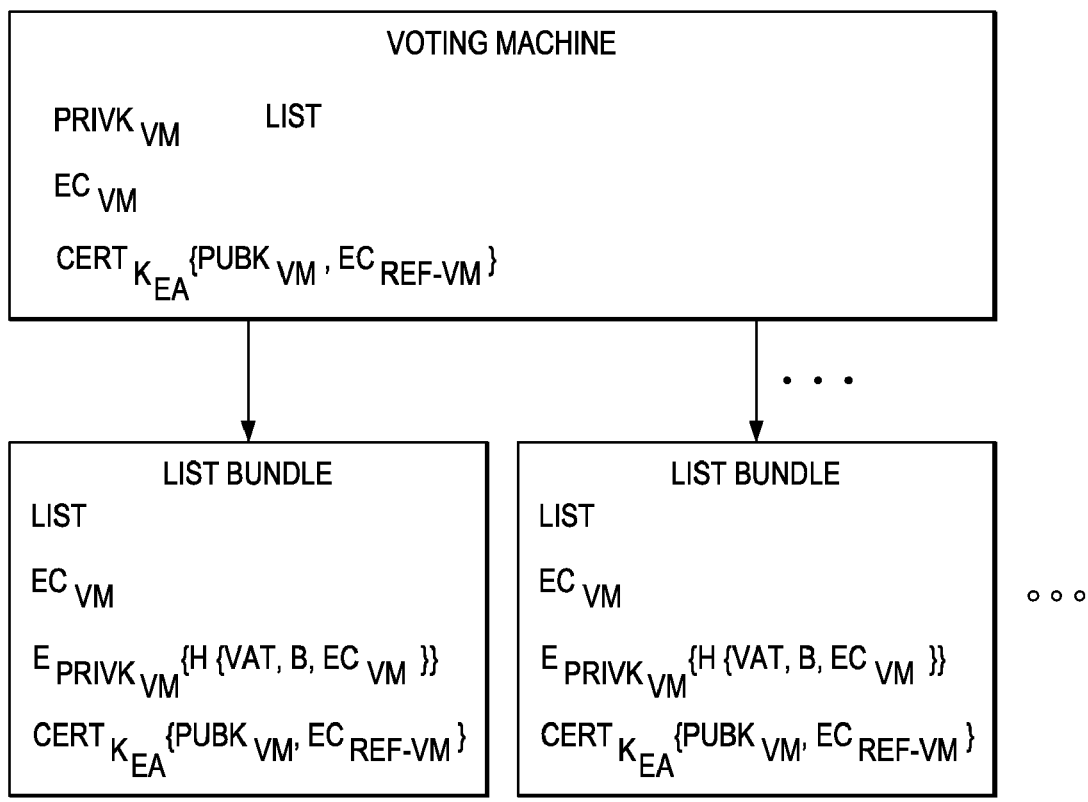
FIGS. 14, 15A-C and 16 are schematic diagrams that further illustrate concepts and features for an embodiment of the invention.

Each Generated VAT List, Spoiled VAT List and precinct tally is verified and signed by the component that created them, at respective steps 1318, 1320 and 1322. The BB List and HB List are verified by the component that created them, at respective steps 1326 and 1328. The signed data includes the list elements concatenated with the EC of the device on which the signature is performed. The facilities of the Trusted Computing Platform are used to generate the EC and to sign the election data and EC. FIG. 14 shows further how signed lists (List Bundles) are created.

Each list is associated with the certificate of the component or device that created it. For example, a Generated VAT List is associated with the certificate of the VATGEN module that created the list.

The List verification process is carried out as follows:
1. The certificate associated with the list is checked to see if it is one of the verified certificates published by the Election Authority.
2. The signature on the list is verified using the public key from the certificate and conventional digital signature algorithms.
3. The EC associated with the list is verified.

Figure 13E:
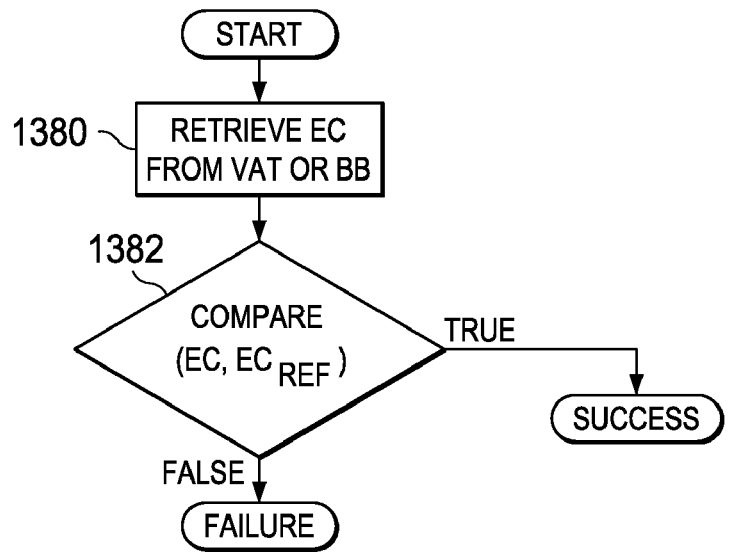

Further details on how ECs are verified are provided in connection with FIG. 13E. Decision step 1324 determines whether the Ballot Bundle or the Hashed Ballot embodiment is being used. If the Ballot Bundle embodiment is being used, then the published BB Lists are verified at step 1326. Otherwise, the HB Lists are verified at step 1328.

Steps 1330-1334 of FIG. 13B describe the details of verifying the contents of Generated VAT lists, and show how the contents of each published Generated VAT List are verified after the integrity of the list itself has been verified. Each VATGEN module that executed in the election produces a Generated VAT List that gets published. Each list contains zero or more VATs generated by that same VATGEN module. Verification inspects every VAT in every list at step 1330. This inspection includes verifying the VATGEN signature and verifying the EC at step 1332, both of which are part of the VAT. Verification uses the certificate that is part of the VAT. In addition to checking the integrity of each individual VAT, the verification procedure also checks that the nonce value contained in each VAT is unique among all VATs in the election system, at step 1334. This last check detects duplicate VATs.

Steps 1336 and 1338 of FIG. 13C show how the contents of each published Spoiled VAT List is verified after the integrity of the list itself has been verified. Each Tally Server that executed in the election produces a Spoiled VAT List that gets published. Each list contains zero or more VATs. Verification inspects every VAT in every list at step 1336. This inspection also includes verifying the VATGEN signature and verifying the EC of each VAT, at step 1338. Verification uses the certificate that is part of the VAT.

Steps 1340-1346 of FIG. 13C shows how the contents of each published Ballot Bundle List or Hashed Ballot List is verified, after the integrity of the list itself has been verified. Each Tally Server that executed in the election produces ballot information that gets published. Decision step 1340 determines if Ballot Bundle Lists or Hashed Ballot Lists get published in an election.

If Ballot Bundle Lists are published, the signature and EC of the Voting Machine that generated each BB is verified at step 1342 using the certificate that is part of the BB. In addition, the VATGEN signature and EC of each VAT contained in each Ballot Bundle is verified at step 1344 using the certificate that is part of the VAT.

If Hashed Ballot Lists are published, the VATGEN signature and EC of each VAT contained in each list entry is verified using the certificate that is part of the VAT, as shown by step 1346.

Steps 1348-1352 of FIG. 13C and steps 1354-1358 of FIG. 13D show the process of reconciling election totals with regard to certificates. After the integrity of the various published lists and their content are verified, checks are performed, at steps 1348, 1350 and 1352, respectively, to guarantee that each VATGEN certificate contributes exactly one Generated VAT List, that each Tally Server certificate contributes exactly one Spoiled VAT List, and that each Tally Server certificate contributes exactly one precinct tally. Decision box 1354 determines whether Ballot Bundles or Hashed Ballots are published. If Ballot Bundles are published, then a check is performed at step 1356 to guarantee that each Tally Server certificate contributes exactly one Ballot Bundle List. If Hashed Ballots are published, then a check is performed at step 1356 to guarantee that each Tally Server certificate contributes exactly one Hashed Ballot List at step 1358.

Steps 1360-1362 of FIG. 13D show the process of reconciling election tallies. After the integrity of the various published lists and their content are verified, the overall tally as reported by the Central Tally Application 214 is checked for integrity at step 1360. This check verifies the EA signature and EC associated with the overall tally using the EA Certificate. A check is then performed at step 1362 to verify that the sum of the votes in all precinct tallies equals the overall tally for each contest.

Steps 1364-1372 of FIG. 13D show the process of reconciling VATs, Ballot Bundles, and Hashed Ballots. After the integrity of all published lists and their content are verified, decision box 1364 determines whether Ballot Bundles or Hashed Ballots are published. If Ballot Bundles are published, then the number of (unique) VATs in all Generated VAT Lists must equal the number of VATs in all Spoiled VAT Lists plus the number of VATs in all Ballot Bundle Lists. This is verified at step 1366. In addition, each VAT in a Generated VAT List must appear exactly once in exactly one Ballot Bundle List or Spoiled VAT List. This is verified at step 1368, and the process moves to the task shown by steps 1374-1376 of FIG. 13D.

If Hashed Ballots are published, then the number of (unique) VATs in all Generated VAT Lists must equal the number of VATs in all Spoiled VAT List plus the number of VATs in all Hashed Ballot Lists. This is verified at step 1370. In addition, each VAT in a Generated VAT List must appear exactly once in exactly one Hashed Ballot List or Spoiled VAT List. This is verified at step 1372, and the process moves to the task shown by step 1378 of FIG. 13D.

Steps 1374-1376 of FIG. 13D show the process of reconciling the ballot content with published tallies. In the Ballot Bundle embodiment, all cast ballots are published and members of the general public can perform their own tallies directly from the raw ballot information. For each published Ballot Bundle List, the votes for all contests in all ballots in the list can be tallied or added, as shown at step 1374. These directly calculated tallies can be compared to the tallies published by each precinct Tally Server, at step 1376. Steps 1360-1362 of FIG. 13D show how precinct tallies are reconciled with the overall tally, so reconciling the raw ballot data with the precinct tallies is sufficient to check the overall tally. In one embodiment, the raw ballot data can be used to directly verify the overall tally.

Step 1378 of FIG. 13D shows the process of a voter verifying that the Election Authority has received the ballot cast by that voter. In the Hashed Ballot embodiment, the voter is given a ballot hash code after casting his or her ballot. After the election, all Hashed Ballot Lists are published by the Election Authority. The entries in these lists contain a VAT and the hashed ballot code given to a voter. A voter can verify that the Election Authority has received the voter's ballot by finding the voter's hashed ballot code in a Hashed Ballot List. A voter can also check that his or her hashed ballot code appears in exactly one Hashed Ballot List, as shown at step 1378.

FIG. 13E shows the process of verifying Election Configurations (ECs). An EC can appear in a certificate, a VAT, or a Ballot Bundle. An EC contains measurement data that reflects the state of a Trusted Computing Platform. In a useful embodiment, the TPM defined by the Trusted Computing Group provides a hardware-based root of trust that can measure a device's current state. Once properly configured, a TPM's measurements are cryptographically secure against software attacks that attempt to forge or alter them. In a preferred embodiment, the EC consists of selected Platform Configuration Register (PCR) values and system event logs that record state changes. The PCR values are trusted measurements protected by the TPM hardware and its cryptographic algorithms. The event logs are untrusted data managed outside of the TPM.

EC verification is the process of comparing an actual EC with an expected EC. An actual EC contains the PCR values reported by a device's TPM along with the device's event logs. The expected EC is the reference EC captured during the certificate generation process that the Election Authority performs before the election. Each device certificate contains the reference EC for that device. In particular, the EA certificate contains the reference EC for the Election Authority Server.

Part of the verification of a VAT or Ballot Bundle is the verification of the EC contained in those data objects. After an EC is retrieved from a VAT or BB data object at step 1380 of FIG. 13E, the EC is compared to the appropriate reference EC, at step 1382. This reference EC is found in the certificate of the component or device that created the original data object. If the data object's EC is compatible with the reference EC, the comparison is successful. Otherwise, the comparison fails. In general, the compare function 1382 determines if two ECs are compatible in an implementation-specific way.

In a useful embodiment, the compare function succeeds only if the PCR values in the data object EC exactly match those in the reference EC. In addition, the event log of the data object EC must be compatible with the event log in the reference EC. The compatibility of event logs is based on rules that are implementation dependent. For example, two event logs may be considered compatible in some implementation if they contain the exact same records but in different orders. Other implementations may use stricter compatibility constraints.

In another embodiment, a reference EC can contain multiple sets of {PCR values, event logs}. The compare function returns success if the data object EC is compatible with any of the PCR/log sets.

FIG. 14 illustrates the List Bundle (LB) generation procedure. The list-generating system binds the list to its actual Election Configuration in order to form the LB. In a useful embodiment, the LB also contains the signed certificate to expedite establishment of trust in the originating system's key.

Figure 15A:
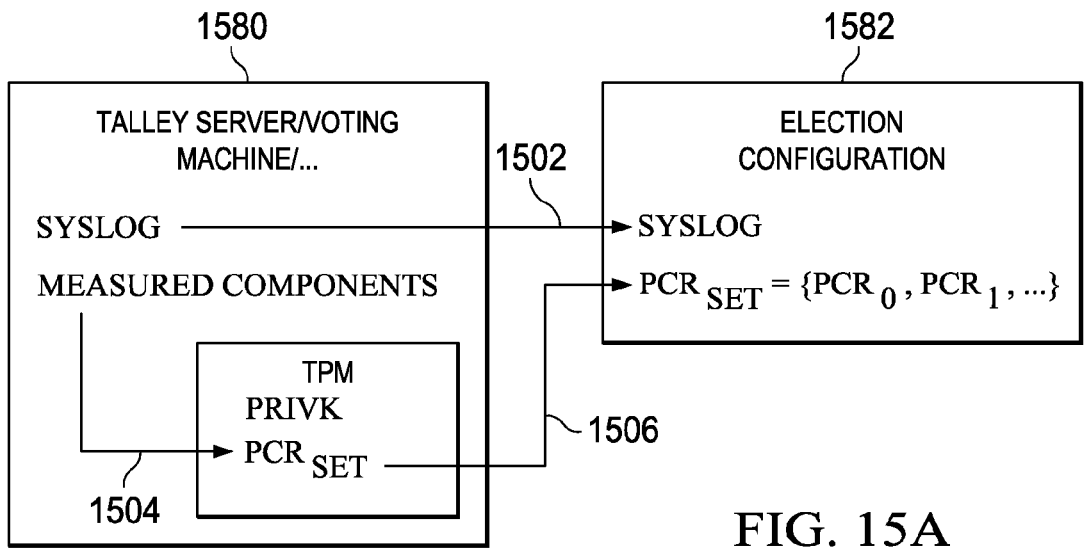
Figure 15B:
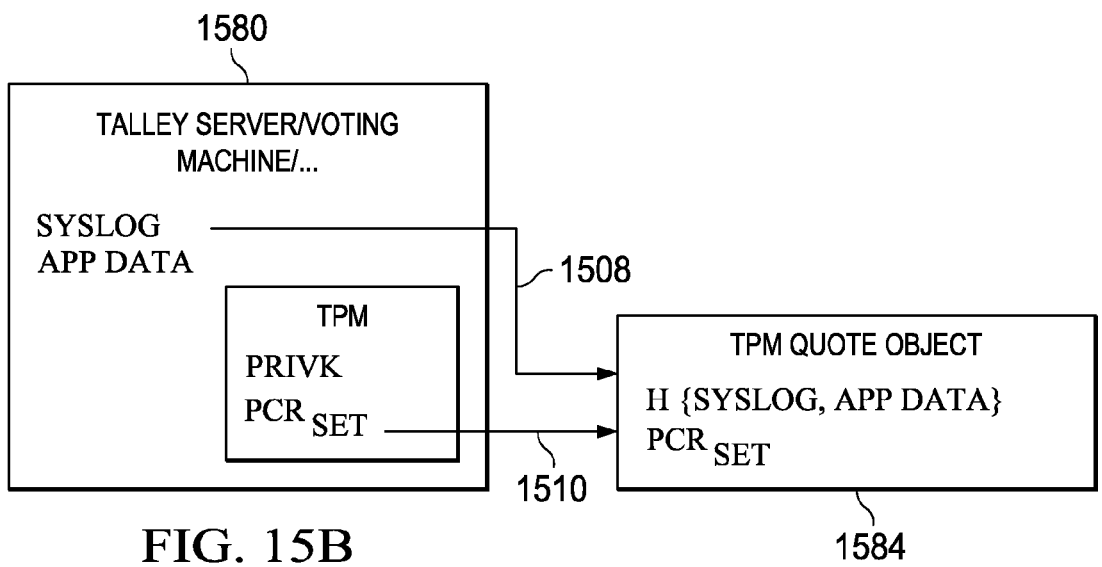
Figure 15C:
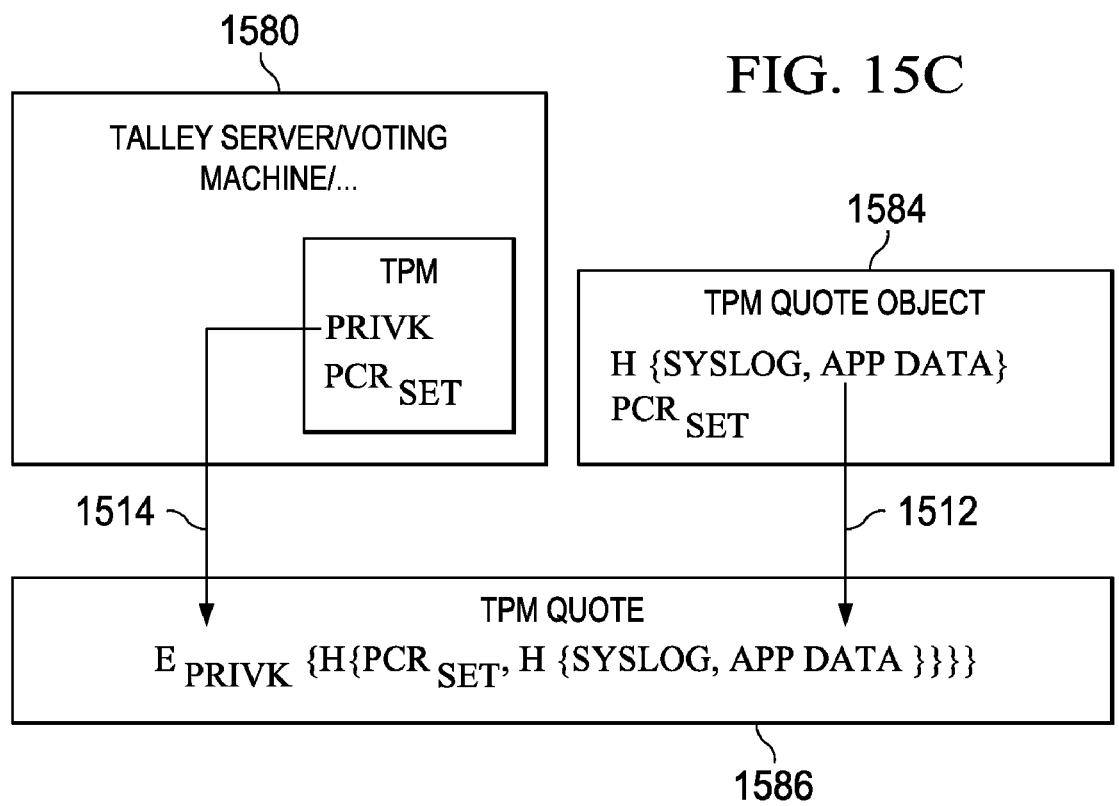

FIGS. 15A, 15B and 15C illustrate the process of binding application data to the Election Configuration (EC).

FIG. 15A shows the definition of the Election Configuration 1582, which typically includes two data components. The first component is the system log 1502 from kernel and user space components of machine 1580. The second component is the set of PCR values 1506 from the TPM device in machine 1580. The TPM device generates the PCR values from the measured components 1504 of machine 1580.

FIG. 15B illustrates the TPM Quote Object 1584 creation, which consists of two main parts. The first part is a hash of the system log and the application data 1508. The second part is a list of PCR's 1510.

FIG. 15C illustrates the TPM Quote 1586 operation. At least one step in the TPM Quote operation takes place inside the TPM of machine 1580 and involves the use of a private key. The TPM uses the Quote Object 1584 to access the PCR values and the hashed system log and application data 1512. These data are combined, hashed, and encrypted via the TPM Quote operation 1514 to generate a TPM Quote 1586. The PCR values and the private key both remain under the control of the TPM device.

FIG. 16 illustrates an embodiment for mutual attestation between any two systems (e.g., "Alice" and "Bob"). After two systems negotiate a shared secret ("session key") via the Diffie-Hellman key negotiation protocol 1602, each side sends a nonce, its actual Election Configuration, and its EA-issued certificate, along with a signature of the actual Election Configuration and the session key. This exchange is done only once for each unique session key.

In another embodiment, any data element that contains an EA-issued certificate may instead contain a reference to a certificate rather than the certificate itself. This approach requires a method by which any certificate reference can be resolved to gain access to the appropriate certificate. This certificate reference approach may be used to reduce the size of election data transmitted and stored. It may also provide a means for accessing a Certificate Revocation List (CRL) and replacement certificates to provide additional robustness in the face of key compromises.

Further Teachings

In embodiments of the present invention, the mutual attestation protocol of the underlying Computing Platform such as the Trusted Computing Platform, is executed before any election data is transmitted on the network. In certain useful embodiments, all election data sent on the polling place network is encrypted; nonces are used according to current practice to thwart known plaintext and double-spending attacks; lists are shuffled to guard against event sequence reconstruction attacks; and public signing keys are generated using the identification facilities of the underlying Trusted Computing Platform.

There are two capabilities of a TCP that are particularly important. First, there needs to be an ability to identify trusted devices. Second, there is a need to attest the configuration of devices at runtime. The first capability is satisfied using the public keys published in certificates to identify devices. The second capability is satisfied when devices perform the mutual attestation protocol before they transact. This attestation protocol uses the EC stored in each device's certificate to verify valid device states, so certificates are central to both capabilities. What makes TCP special is that there is no way that these capabilities can be subverted by using software only.

In useful embodiments, each list published by the Election Authority on the Publication Server is signed by the component that created the list. To tie these signatures to trusted device states, the signatures include the EC of the signing devices, as described above.

The publication of either the ballot bundle list or the hashed ballot list depends on the rules that govern the election. If, however, the ballot bundle lists are published and voters are also given their hash values, as described above in connection with step 106, Generating Ballot Bundles, then a voter would be able to prove how he or she voted to others after the election. This is usually undesirable.

When only the ballot bundle list is published, then actual ballots are available for public examination. This method can only be used under electoral rules that allow ballots to be publicly disclosed. Moreover, by examining the ballot bundle public keys, one can determine which ballots were cast from the same voting machine. Combining this information with VAT public keys, one can determine which ballots were cast in the same polling place. If polling places report their totals separately, as is the current practice in many jurisdictions, one can almost always determine which ballots were cast from which polling place. Associating a polling place with the ballot cast from it may or may not be desirable.

One way to avoid disclosing actual ballots is to publish only the hashed ballot list as described above in connection with step 110, Publishing Election Results. This approach allows voters to verify that the election authority received their votes, but voters cannot determine whether their ballots were properly counted. Voters can have confidence in the election results if they trust their Voting System and the underlying Trusted Computing Platform. Ultimately, this trust relies on the correctness of voting system code and the verification of the signatures and Election Configurations associated with all election data.

Those knowledgeable in the art will recognize that the various lists, mappings, and tables presented in the above discussion can be implemented using a range of data structures to achieve different levels of performance and function. In addition, it should be recognized that standard remedial actions, such as writing logs and generating alerts, should be taken when operational errors occur in a voting system.

Figure 17:
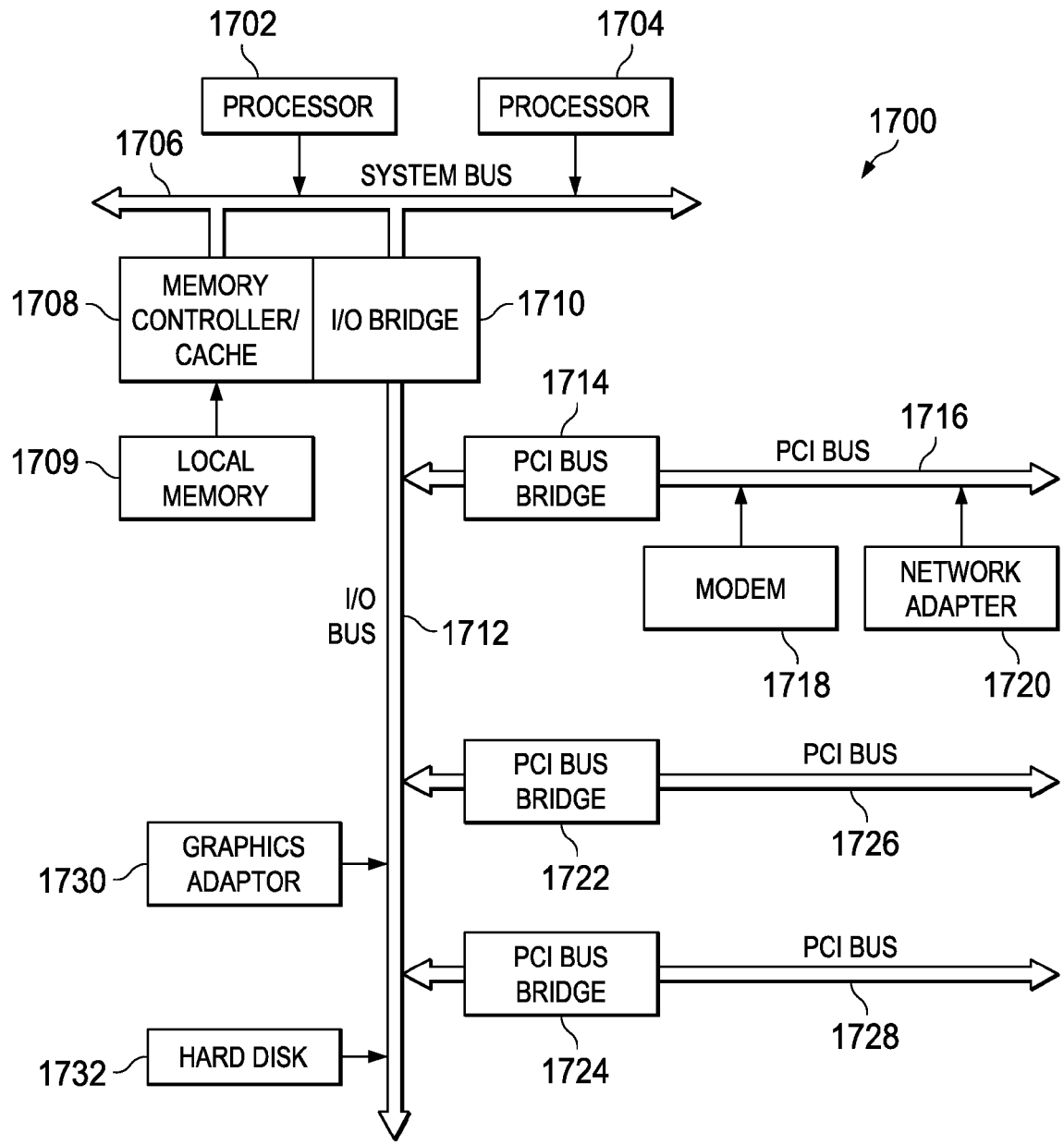
FIG. 17 is a block diagram showing a computer or data processing system which may be used in implementing embodiments of the invention.

Referring to FIG. 17, there is shown a block diagram depicting a data processing system 1700 that may be implemented as a server or other component, such as EA server 202 or publication server 204 of FIG. 2, or tally server 302 or other components of FIG. 3. Data processing system 1700 may be a symmetric multiprocessor (SMP) system including a plurality of processors 1702 and 1704 connected to system bus 1706. Alternatively, a single processor system may be employed. Also connected to system bus 1706 is memory controller/cache 1708, which provides an interface to local memory 1709. I/O bus bridge 1710 is connected to system bus 206 and provides an interface to I/O b us 1712. Memory controller/cache 1708 and I/O bus bridge 1710 may be integrated as depicted.

Peripheral component interconnect (PCI) bus bridge 1714 connected to I/O bus 1712 provides an interface to PCI local bus 1716. A number of modems may be connected to PCI bus 1716. Typical PCI bus implementations will support four PCI expansion slots or add-in connectors.

Additional PCI bus bridges 1722 and 1724 provide interfaces for additional PCI uses 1720 and 1728, from which additional modems or network adapters may be supported. In this manner, data processing system 200 allows connection to multiple network computers. A memory-mapped graphics adapter 1730 and hard disk 1732 may also be connected to I/O bus 1712 as depicted, either directly or indirectly.

Those of ordinary skill in the art will appreciate that the hardware depicted in FIG. 17 may vary. For example, other peripheral devices, such as optical disk drives and the like, also may be used in addition to or in place of the hardware depicted. The depicted example is not meant to imply architectural limitations with respect to the present invention. The data processing system depicted in FIG. 17 may be, for example, an IBM RISC 6000 system, a product of International Business Machines Corporation in Armonk, N.Y., running the Advanced Interactive Executive (AIX) operating system. Alternatively, the operating system may be another commercially available operating system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for verifying ballots that are cast in an election, the method comprising the steps of:
    executing a mutual attestation procedure between a plurality of devices communicating in a voting system via a network, wherein the mutual attestation procedure determines that only devices within the plurality of devices loaded with specified software participate in the voting system;
    publishing a number of certificates, wherein each certificate corresponds to one of the plurality of devices communicating in the voting system via the network, and wherein each certificate contains one or more public keys associated with its corresponding device and also contains reference election configuration data defining a reference machine execution environment state of its corresponding device generated during a certificate generation process before the election;
    generating a voter authorization token for each authorized voter, wherein each voter authorization token enables one authorized voter to cast one and only one of the ballots in the election;
    generating a set of voting results in response to using a given voter authorization token to cast a given ballot using a specified voting device, wherein the set of voting results includes the given voter authorization token and the given ballot after being marked;
    generating current election configuration data that defines a current machine execution environment state of the specified voting device when the given ballot was cast, wherein the current election configuration data also is included with the set of voting results, and wherein the set of voting results is digitally signed using a unique private key that corresponds to one of the one or more public keys that is associated with the specified voting device;
    comparing the current election configuration data that defines the current machine execution environment state of the specified voting device with the reference configuration data that defines the reference machine execution environment state for the specified voting device in the corresponding certificate to determine that a match exists verifying a valid machine execution environment state of the specified voting device; and
    publishing a set of items that include at least lists of all voter authorization tokens and all sets of voting results that are respectively generated in connection with the election, wherein the set of items published are available with the number of certificates published to verify the ballots that are cast in the election.

2. The method of claim 1, wherein each device of the voting system includes a trusted platform module integrated circuit that digitally signs election data generated by each device.

3. The method of claim 1, wherein a list of the sets of voting results comprises either a list of ballot bundles to verify each ballot that was cast in the election or alternatively comprises a list of hashed ballot sets to verify that individual ballots were correctly cast in the election.

4. The method of claim 3, wherein a ballot bundle for the given ballot is formed by concatenating the given voter authorization token, the given ballot after being marked, a unique nonce value associated with the given ballot, and the current election configuration data that defines the current machine execution environment state of the specified voting device when the given ballot was cast into a single message, and wherein a digital signature of the specified voting device is applied to the single message.

5. The method of claim 3, wherein a hashed ballot set for the given ballot is formed by applying a hashing function to a set of values respectively provided by the given voter authorization token, the given ballot after being marked, and the current election configuration data that defines the current machine execution environment state of the specified voting device when the given ballot was cast.

6. The method of claim 1, wherein the voting system includes a tally server that verifies digital signatures of respective sets of voting results, and wherein the tally server, in response to verifying a given digital signature of a given set of voting results, adds a vote contained in a ballot of the given set of voting results to a cumulative tally for each particular contest in the election.

7. The method of claim 1, further comprising the steps of:
    placing a time period on each generated voter authorization token;
    determining whether to issue a ballot response for each generated voter authorization token;
    placing a particular voter authorization token on a spoiled voter authorization token list when the time period placed on the particular voter authorization token expires before a ballot request has been issued for the particular voter authorization token; and
    including the spoiled voter authorization token list in the set of items published.

8. The method of claim 1, wherein each voter authorization token is generated by a voter authorization token module, and wherein the voter authorization token module has a unique private key that corresponds to one of the one or more public keys, and wherein the unique private key is used to digitally sign each voter authorization token generated by the voter authorization token module.

9. The method of claim 1, wherein the voting system includes a check-in station that verifies digital signatures of respective voter authorization tokens, and in response to verifying a particular digital signature of a particular voter authorization token, the check-in station generates and makes a random code available to a voter associated with the particular voter authorization token to enable the voter to use the specified voting device to cast a ballot.

10. The method of claim 8, wherein each voter authorization token generated by the voter authorization token module includes election information, a nonce comprising a random value which is unique to a particular voter authorization token, and an execution state of the voter authorization token module when the voter authorization token was generated.

11. The method of claim 2, wherein the current election configuration data and the reference election configuration data for each device in the plurality of devices includes Platform Configuration Register values of a set of platform configuration registers in the trusted platform module integrated circuit included in each device and system log entries that record machine execution environment state changes in each device.

12. An apparatus for verifying ballots that are cast in an election, the apparatus comprising:
one or more processors; and
one or more storage devices, wherein the one or more storage devices store computer usable program code that is executable by the one or more processors to perform a method of:
executing a mutual attestation procedure between a plurality of devices communicating in a voting system via a network, wherein the mutual attestation procedure determines that only devices within the plurality of devices loaded with specified software participate in the voting system;
publishing a number of certificates, wherein each certificate corresponds to one of the plurality of devices communicating in the voting system via the network, and wherein each certificate contains one or more public keys associated with its corresponding device and also contains reference election configuration data defining a reference machine execution environment state of its corresponding device generated during a certificate generation process before the election;
generating a voter authorization token for each authorized voter, wherein each voter authorization token enables one authorized voter to cast one and only one of the ballots in the election;
generating a set of voting results in response to using a given voter authorization token to cast a given ballot using a specified voting device, wherein the set of voting results includes the given voter authorization token and the given ballot after being marked;
generating current election configuration data that defines a current machine execution environment state of the specified voting device when the given ballot was cast, wherein the current election configuration data also is included with the set of voting results, and wherein the set of voting results is digitally signed using a unique private key that corresponds to one of the one or more public keys that is associated with the specified voting device;
comparing the current election configuration data that defines the current machine execution environment state of the specified voting device with the reference configuration data that defines the reference machine execution environment state for the specified voting device in the corresponding certificate to determine that a match exists verifying a valid machine execution environment state of the specified voting device; and
publishing a set of items that include at least lists of all voter authorization tokens and all sets of voting results that are respectively generated in connection with the election, wherein the set of items published are available with the number of certificates published to verify the ballots that are cast in the election.

13. The apparatus of claim 12, wherein each device of the voting system includes a trusted platform module integrated circuit that digitally signs election data generated by each device.

14. The apparatus of claim 12, wherein a list of the sets of voting results comprises either a list of ballot bundles to verify each ballot that was cast in the election or alternatively comprises a list of hashed ballot sets to verify that individual ballots were correctly cast in the election.

15. A computer program product stored on a computer readable storage device having computer usable program code embodied thereon that when executed by a computer cause the computer to perform a method for verifying ballots that are cast in an election, comprising:
executing a mutual attestation procedure between a plurality of devices communicating in a voting system via a network, wherein the mutual attestation procedure determines that only devices within the plurality of devices loaded with specified software participate in the voting system;
publishing a number of certificates, wherein each certificate corresponds to one of the plurality of devices communicating in the voting system via the network, and wherein each certificate contains one or more public keys associated with its corresponding device and also contains reference election configuration data defining a reference machine execution environment state of its corresponding device generated during a certificate generation process before the election;
generating a voter authorization token for each authorized voter, wherein each voter authorization token enables one authorized voter to cast one and only one of the ballots in the election;
generating a set of voting results in response to using a given voter authorization token to cast a given ballot using a specified voting device, wherein the set of voting results includes the given voter authorization token and the given ballot after being marked;
generating current election configuration data that defines a current machine execution environment state of the specified voting device when the given ballot was cast, wherein the current election configuration data also is included with the set of voting results, and wherein the set of voting results is digitally signed using a unique private key that corresponds to one of the one or more public keys that is associated with the specified voting device;
comparing the current election configuration data that defines the current machine execution environment state of the specified voting device with the reference configuration data that defines the reference machine execution environment state for the specified voting device in the corresponding certificate to determine that a match exists verifying a valid machine execution environment state of the specified voting device; and
publishing a set of items that include at least lists of all voter authorization tokens and all sets of voting results that are respectively generated in connection with the election, wherein the set of items published are available with the number of certificates published to verify the ballots that are cast in the election.

16. The computer program product of claim 15, wherein each device of the voting system includes a trusted platform module integrated circuit that digitally signs election data generated by each device.

17. The computer program product of claim 15, wherein a list of the sets of voting results comprises either a list of ballot bundles to verify each ballot that was cast in the election or alternatively comprises a list of hashed ballot sets to verify that individual ballots were correctly cast in the election.

18. The method of claim 1, further comprising:
   determining that a number of generated voter authorization tokens equals a sum of a number of spoiled voter authorization tokens plus a number of used authorization tokens associated with ballot information to verify election results.

19. The method of claim 1, wherein the specified software loaded in each device within the plurality of devices in the voting system is defined in the reference configuration data.

20. The method of claim 1, wherein the mutual attestation procedure is executed prior to transmitting any election data over the network.

* * * * *